(12) United States Patent
Erasmus et al.

(10) Patent No.: US 10,580,015 B2
(45) Date of Patent: Mar. 3, 2020

(54) SYSTEMS, METHODS, AND MEDIA FOR EXECUTING AND OPTIMIZING ONLINE MARKETING INITIATIVES

(75) Inventors: Davina Erasmus, Zuid Holland (NL); Lars Møllebjerg, Noord Holland (NL); Robert Peter Faber, Flevoland (NL)

(73) Assignee: SDL Netherlands B.V., Amsterdam (NL)

( * ) Notice: Subject to any disclaimer, the term of this patent is extended or adjusted under 35 U.S.C. 154(b) by 139 days.

(21) Appl. No.: 13/035,852

(22) Filed: Feb. 25, 2011

(65) Prior Publication Data
US 2012/0221407 A1 Aug. 30, 2012

(51) Int. Cl.
G06Q 30/02 (2012.01)
(52) U.S. Cl.
CPC ......... *G06Q 30/02* (2013.01); *G06Q 30/0201* (2013.01)
(58) Field of Classification Search
CPC ...................... G06Q 30/0244; G06Q 30/0242
USPC ................ 705/14, 14.43, 14.41, 26.3, 14.55; 709/224, 206; 725/60; 701/533
See application file for complete search history.

(56) References Cited

U.S. PATENT DOCUMENTS

| | | |
|---|---|---|
| 4,845,658 A | 7/1989 | Gifford |
| 4,916,614 A | 4/1990 | Kaji |
| 4,920,499 A | 4/1990 | Skeirik |
| 5,075,850 A | 12/1991 | Asahioka et al. |
| 5,295,068 A | 3/1994 | Nishino et al. |
| 5,351,189 A | 9/1994 | Doi |
| 5,418,717 A | 5/1995 | Su et al. |
| 5,477,451 A | 12/1995 | Brown et al. |
| 5,497,319 A | 3/1996 | Chong et al. |
| 5,640,575 A | 6/1997 | Maruyama |

(Continued)

FOREIGN PATENT DOCUMENTS

| | | |
|---|---|---|
| AU | 5240198 A | 5/1998 |
| AU | 694367 B2 | 7/1998 |

(Continued)

OTHER PUBLICATIONS

Wayne W Eckerson, Performance Management Strategies, 2009 (Year: 2009).*

(Continued)

*Primary Examiner* — Tarek Elchanti
(74) *Attorney, Agent, or Firm* — Carr & Ferrell LLP

(57) ABSTRACT

Systems, methods, and media for executing and optimizing the performance of online marketing initiatives are provided herein. Methods may include the steps of receiving input corresponding to one or more marketing initiatives, each of the one or more online marketing initiatives including at least one entry asset, generating one or more online marketing initiatives from the received input, providing the one or more online marketing initiatives to one or more presentation servers for publishing the one or more marketing initiative to one or more platforms, receiving tracking data for at least one of the one or more marketing initiatives, comparing the tracking data to one or more performance metrics to determine the performance of the at least one marketing initiative, and storing at least one of the tracking data and the performance metric in a database coupled to at least one of the web server and the one or more presentation servers.

20 Claims, 7 Drawing Sheets

(56) References Cited

U.S. PATENT DOCUMENTS

| | | |
|---|---|---|
| 5,644,775 A | 7/1997 | Thompson et al. |
| 5,675,802 A | 10/1997 | Allen et al. |
| 5,708,780 A | 1/1998 | Levergood et al. |
| 5,715,314 A | 2/1998 | Payne et al. |
| 5,724,424 A | 3/1998 | Gifford |
| 5,751,957 A | 5/1998 | Hiroya et al. |
| 5,774,868 A | 6/1998 | Cragun et al. |
| 5,812,776 A | 9/1998 | Gifford |
| 5,813,007 A | 9/1998 | Nielsen |
| 5,873,056 A | 2/1999 | Liddy |
| 5,884,097 A | 3/1999 | Li et al. |
| 5,884,246 A | 3/1999 | Boucher et al. |
| 5,894,554 A | 4/1999 | Lowery et al. |
| 5,895,446 A | 4/1999 | Takeda et al. |
| 5,909,492 A | 6/1999 | Payne et al. |
| 5,966,685 A | 10/1999 | Flanagan et al. |
| 5,974,372 A | 10/1999 | Barnes |
| 5,978,828 A | 11/1999 | Greer et al. |
| 5,987,401 A | 11/1999 | Trudeau |
| 5,987,402 A | 11/1999 | Murata et al. |
| 6,026,413 A | 2/2000 | Challenger et al. |
| 6,041,333 A | 3/2000 | Bretschneider et al. |
| 6,041,360 A | 3/2000 | Himmel et al. |
| 6,044,344 A | 3/2000 | Kanevsky |
| 6,049,785 A | 4/2000 | Gifford |
| 6,085,162 A | 7/2000 | Cherny |
| 6,092,035 A | 7/2000 | Kurachi et al. |
| 6,108,703 A | 8/2000 | Leighton et al. |
| 6,122,666 A | 9/2000 | Beurket et al. |
| 6,128,652 A | 10/2000 | Toh et al. |
| 6,128,655 A | 10/2000 | Fields et al. |
| 6,161,082 A | 12/2000 | Goldberg et al. |
| 6,163,785 A | 12/2000 | Carbonell et al. |
| 6,195,649 B1 | 2/2001 | Gifford |
| 6,199,051 B1 | 3/2001 | Gifford |
| 6,205,437 B1 | 3/2001 | Gifford |
| 6,212,634 B1 | 4/2001 | Geer et al. |
| 6,216,212 B1 | 4/2001 | Challenger et al. |
| 6,219,818 B1 | 4/2001 | Freivald et al. |
| 6,256,712 B1 | 7/2001 | Challenger et al. |
| 6,263,332 B1 | 7/2001 | Nasr et al. |
| 6,278,969 B1 | 8/2001 | King et al. |
| 6,279,112 B1 | 8/2001 | O'toole, Jr. et al. |
| 6,330,566 B1 | 12/2001 | Durham |
| 6,330,598 B1 | 12/2001 | Beckwith et al. |
| 6,338,033 B1 | 1/2002 | Bourbonnais et al. |
| 6,347,316 B1 | 2/2002 | Redpath |
| 6,356,865 B1 | 3/2002 | Franz et al. |
| 6,356,903 B1 | 3/2002 | Baxter et al. |
| 6,363,337 B1 | 3/2002 | Amith |
| 6,401,105 B1 | 6/2002 | Carlin et al. |
| 6,415,257 B1 | 7/2002 | Junqua |
| 6,438,540 B2 | 8/2002 | Nasr et al. |
| 6,449,599 B1 | 9/2002 | Payne et al. |
| 6,477,524 B1 | 11/2002 | Taskiran |
| 6,477,575 B1 * | 11/2002 | Koeppel et al. ............... 709/224 |
| 6,490,358 B1 | 12/2002 | Geer et al. |
| 6,490,563 B2 | 12/2002 | Hon |
| 6,526,426 B1 | 2/2003 | Lakritz |
| 6,581,061 B2 | 6/2003 | Graham |
| 6,623,529 B1 | 9/2003 | Lakritz |
| 6,658,627 B1 | 12/2003 | Gallup |
| 6,725,333 B1 | 4/2004 | Degenaro et al. |
| 6,748,569 B1 | 6/2004 | Brooke et al. |
| 6,782,384 B2 | 8/2004 | Sloan et al. |
| 6,865,528 B1 | 3/2005 | Huang |
| 6,920,419 B2 | 7/2005 | Kitamura |
| 6,973,656 B1 | 12/2005 | Huynh et al. |
| 6,976,207 B1 | 12/2005 | Rujan |
| 6,990,439 B2 | 1/2006 | Xun |
| 7,013,264 B2 | 3/2006 | Dolan |
| 7,031,908 B1 | 4/2006 | Huang |
| 7,050,964 B2 | 5/2006 | Menzes |
| 7,089,493 B2 | 8/2006 | Hatori et al. |
| 7,111,229 B2 | 9/2006 | Nicholas et al. |
| 7,124,092 B2 | 10/2006 | O'toole, Jr. et al. |
| 7,177,792 B2 | 2/2007 | Knight |
| 7,191,447 B1 | 3/2007 | Ellis et al. |
| 7,207,005 B2 | 4/2007 | Laktritz |
| 7,209,875 B2 | 4/2007 | Quirk |
| 7,249,013 B2 | 7/2007 | Al-Onaizan |
| 7,249,314 B2 | 7/2007 | Walker et al. |
| 7,272,639 B1 | 9/2007 | Levergood et al. |
| 7,295,962 B2 | 11/2007 | Marcu |
| 7,295,963 B2 | 11/2007 | Richardson et al. |
| 7,302,429 B1 | 11/2007 | Wanker |
| 7,333,927 B2 | 2/2008 | Lee |
| 7,340,388 B2 | 3/2008 | Soricut |
| 7,353,165 B2 | 4/2008 | Zhou |
| 7,369,984 B2 | 5/2008 | Fairweather |
| 7,383,320 B1 | 6/2008 | Silberstein et al. |
| 7,389,222 B1 | 6/2008 | Langmead |
| 7,389,223 B2 | 6/2008 | Atkin |
| 7,448,040 B2 | 11/2008 | Ellis et al. |
| 7,454,326 B2 | 11/2008 | Marcu |
| 7,509,313 B2 | 3/2009 | Colledge |
| 7,516,062 B2 | 4/2009 | Chen et al. |
| 7,533,013 B2 | 5/2009 | Marcu |
| 7,606,814 B2 | 10/2009 | Deily et al. |
| 7,620,538 B2 | 11/2009 | Marcu |
| 7,620,549 B2 | 11/2009 | Di Cristo |
| 7,624,005 B2 | 11/2009 | Koehn |
| 7,668,782 B1 | 2/2010 | Reistad et al. |
| 7,680,647 B2 | 3/2010 | Moore |
| 7,698,126 B2 | 4/2010 | Kohlmeier et al. |
| 7,716,037 B2 | 5/2010 | Precoda |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,813,918 B2 | 10/2010 | Muslea |
| 7,836,057 B1 | 11/2010 | Micaelian et al. |
| 7,865,358 B2 | 1/2011 | Green |
| 7,904,595 B2 | 3/2011 | Cheng et al. |
| 7,925,493 B2 | 4/2011 | Watanabe |
| 7,945,437 B2 | 5/2011 | Mount et al. |
| 7,949,633 B1 | 5/2011 | Shaver et al. |
| 7,958,453 B1 | 6/2011 | Taing |
| 7,983,896 B2 | 7/2011 | Ross |
| 7,983,897 B2 | 7/2011 | Chin |
| 8,015,222 B2 | 9/2011 | Abnous et al. |
| 8,078,450 B2 | 12/2011 | Anisimovich et al. |
| 8,135,575 B1 | 3/2012 | Dean |
| 8,185,830 B2 | 5/2012 | Saha et al. |
| 8,195,447 B2 | 6/2012 | Anismovich |
| 8,214,196 B2 | 7/2012 | Yamada |
| 8,239,186 B2 | 8/2012 | Chin |
| 8,239,207 B2 | 8/2012 | Seligman |
| 8,260,846 B2 | 9/2012 | Lahav |
| 8,286,185 B2 | 10/2012 | Ellis et al. |
| 8,296,127 B2 | 10/2012 | Marcu |
| 8,296,463 B2 | 10/2012 | Cheng et al. |
| 8,346,585 B1 | 1/2013 | Griffith et al. |
| 8,352,244 B2 | 1/2013 | Gao et al. |
| 8,364,463 B2 | 1/2013 | Miyamoto |
| 8,386,234 B2 | 2/2013 | Uchimoto et al. |
| 8,413,045 B2 | 4/2013 | Lemonik et al. |
| 8,423,346 B2 | 4/2013 | Seo et al. |
| 8,442,812 B2 | 5/2013 | Ehsani |
| 8,453,052 B1 | 5/2013 | Newman et al. |
| 8,489,980 B2 | 7/2013 | Lakritz |
| 8,521,506 B2 | 8/2013 | Lancaster et al. |
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,635,327 B1 | 1/2014 | Levergood et al. |
| 8,635,539 B2 | 1/2014 | Young |
| 8,666,725 B2 | 3/2014 | Och |
| 8,671,214 B2 | 3/2014 | Lockhart et al. |

(56) References Cited

U.S. PATENT DOCUMENTS

| | | |
|---|---|---|
| 8,683,329 B2 | 3/2014 | Tang et al. |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,799,200 B2 | 8/2014 | Lahav |
| 8,818,790 B2 | 8/2014 | He et al. |
| 8,843,359 B2 | 9/2014 | Lauder |
| 8,862,456 B2 | 10/2014 | Krack et al. |
| 8,898,052 B2 | 11/2014 | Waibel |
| 8,903,707 B2 | 12/2014 | Zhao |
| 8,909,683 B1 | 12/2014 | Ledet |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,954,539 B2 | 2/2015 | Lahav |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,317,622 B1 | 4/2016 | Zuromski et al. |
| 9,336,487 B2 | 5/2016 | Lahav |
| 9,369,489 B2 | 6/2016 | Kato |
| 9,396,184 B2 | 7/2016 | Roy |
| 9,396,436 B2 | 7/2016 | Lahav |
| 9,430,449 B2 | 8/2016 | Leblond et al. |
| 9,465,797 B2 | 10/2016 | Ji |
| 9,471,563 B2 | 10/2016 | Trese |
| 9,519,640 B2 | 12/2016 | Perez |
| 9,547,626 B2 | 1/2017 | de Voogd |
| 9,552,355 B2 | 1/2017 | Dymetman |
| 9,596,188 B2 | 3/2017 | Cheng et al. |
| 9,600,473 B2 | 3/2017 | Leydon |
| 9,613,026 B2 | 4/2017 | Hodson |
| 9,773,270 B2 | 9/2017 | Costa et al. |
| 9,781,050 B2 | 10/2017 | Cheng et al. |
| 9,954,794 B2 | 4/2018 | Cheng et al. |
| 10,025,776 B1 | 7/2018 | Sjoberg et al. |
| 10,061,749 B2 | 8/2018 | Homer et al. |
| 2001/0029507 A1 | 10/2001 | Nojima |
| 2002/0007383 A1 | 1/2002 | Yoden et al. |
| 2002/0023101 A1 | 2/2002 | Kurihara et al. |
| 2002/0046018 A1 | 4/2002 | Marcu |
| 2002/0065848 A1 | 5/2002 | Walker et al. |
| 2002/0083103 A1 | 6/2002 | Ballance |
| 2002/0103698 A1* | 8/2002 | Cantrell ............. G06Q 30/02 705/14.55 |
| 2002/0112013 A1* | 8/2002 | Walsh ............. G06F 17/30867 709/206 |
| 2002/0120762 A1 | 8/2002 | Cheng et al. |
| 2002/0124109 A1 | 9/2002 | Brown |
| 2002/0178166 A1 | 11/2002 | Hsia |
| 2002/0178257 A1 | 11/2002 | Cerrato |
| 2003/0009320 A1 | 1/2003 | Furuta |
| 2003/0023757 A1 | 1/2003 | Ishioka et al. |
| 2003/0158953 A1 | 8/2003 | Lal |
| 2003/0163346 A1 | 8/2003 | Tinti et al. |
| 2003/0200094 A1 | 10/2003 | Gupta |
| 2004/0010496 A1 | 1/2004 | Behrendt et al. |
| 2004/0015723 A1 | 1/2004 | Pham et al. |
| 2004/0019849 A1 | 1/2004 | Weng et al. |
| 2004/0034520 A1 | 2/2004 | Langkilde-Geary |
| 2004/0039593 A1 | 2/2004 | Eskandari |
| 2004/0044517 A1 | 3/2004 | Palmquist |
| 2004/0044576 A1* | 3/2004 | Kurihara et al. ............. 705/14 |
| 2004/0148409 A1 | 7/2004 | Davis et al. |
| 2004/0187090 A1 | 9/2004 | Meacham |
| 2004/0255281 A1 | 12/2004 | Imamura et al. |
| 2005/0039116 A1 | 2/2005 | Slack-Smith |
| 2005/0086105 A1* | 4/2005 | McFadden ............. G06Q 30/02 705/14.43 |
| 2005/0156714 A1* | 7/2005 | McCarthy ............. B60R 1/12 340/425.5 |
| 2005/0171944 A1 | 8/2005 | Palmquist |
| 2005/0187774 A1 | 8/2005 | Vuong |
| 2005/0189415 A1 | 9/2005 | Fano et al. |
| 2005/0203884 A1 | 9/2005 | Allen et al. |
| 2005/0228865 A1 | 10/2005 | Hirsch |
| 2005/0235351 A1 | 10/2005 | Seltzer et al. |
| 2005/0246283 A1 | 11/2005 | Gwiazda et al. |
| 2006/0041558 A1 | 2/2006 | McCauley et al. |
| 2006/0053367 A1 | 3/2006 | Chen et al. |
| 2006/0080257 A1 | 4/2006 | Vaughan et al. |
| 2006/0080265 A1 | 4/2006 | Hinds et al. |
| 2006/0080397 A1 | 4/2006 | Chene et al. |
| 2006/0095526 A1 | 5/2006 | Levergood et al. |
| 2006/0178918 A1 | 8/2006 | Mikurak |
| 2006/0248442 A1 | 11/2006 | Rosenstein et al. |
| 2006/0282255 A1 | 12/2006 | Lu |
| 2007/0016363 A1* | 1/2007 | Huang ............. G08G 1/202 701/533 |
| 2007/0022003 A1 | 1/2007 | Chao et al. |
| 2007/0033104 A1* | 2/2007 | Collins ............. G06F 17/2785 705/14.41 |
| 2007/0043553 A1 | 2/2007 | Dolan |
| 2007/0047781 A1 | 3/2007 | Hull et al. |
| 2007/0048714 A1 | 3/2007 | Plastina et al. |
| 2007/0083425 A1 | 4/2007 | Cousineau et al. |
| 2007/0112553 A1 | 5/2007 | Jacobson |
| 2007/0118545 A1 | 5/2007 | Chandrasekharan et al. |
| 2007/0192374 A1 | 8/2007 | Abnous et al. |
| 2007/0208991 A1 | 9/2007 | Rider |
| 2007/0209005 A1 | 9/2007 | Shaver et al. |
| 2007/0209080 A1 | 9/2007 | Ture et al. |
| 2007/0226058 A1* | 9/2007 | Lorenzen ............. G06Q 30/02 705/14.41 |
| 2007/0234213 A1 | 10/2007 | Krikorian et al. |
| 2008/0028300 A1 | 1/2008 | Krieger et al. |
| 2008/0086298 A1 | 4/2008 | Anismovich |
| 2008/0109374 A1 | 5/2008 | Levergood et al. |
| 2008/0120089 A1 | 5/2008 | Schurig |
| 2008/0120120 A1 | 5/2008 | Cirulli et al. |
| 2008/0154577 A1 | 6/2008 | Kim |
| 2008/0195664 A1* | 8/2008 | Maharajh ............. G06F 17/30035 |
| 2008/0201344 A1 | 8/2008 | Levergood et al. |
| 2008/0209320 A1 | 8/2008 | Mawhinney et al. |
| 2008/0244053 A1 | 10/2008 | Sampson et al. |
| 2008/0256235 A1 | 10/2008 | Or Sim et al. |
| 2008/0270398 A1 | 10/2008 | Landau et al. |
| 2008/0288240 A1 | 11/2008 | D'Agostini et al. |
| 2008/0316228 A1 | 12/2008 | Seljavaara |
| 2009/0061764 A1 | 3/2009 | Lockhart et al. |
| 2009/0094017 A1 | 4/2009 | Chen et al. |
| 2009/0099931 A1 | 4/2009 | Aaltonen et al. |
| 2009/0138458 A1 | 5/2009 | Wanker |
| 2009/0197580 A1 | 8/2009 | Gupta et al. |
| 2009/0217196 A1 | 8/2009 | Neff et al. |
| 2009/0217352 A1 | 8/2009 | Shen et al. |
| 2009/0234711 A1 | 9/2009 | Ramer et al. |
| 2009/0240539 A1 | 9/2009 | Slawson |
| 2009/0248801 A1 | 10/2009 | Then et al. |
| 2009/0259684 A1 | 10/2009 | Knight et al. |
| 2009/0313005 A1 | 12/2009 | Jaquinta |
| 2009/0313245 A1 | 12/2009 | Weyl et al. |
| 2010/0017704 A1 | 1/2010 | Jaffe et al. |
| 2010/0023475 A1 | 1/2010 | Lahav |
| 2010/0023581 A1 | 1/2010 | Lahav |
| 2010/0057439 A1 | 3/2010 | Ideuchi et al. |
| 2010/0057561 A1 | 3/2010 | Gifford |
| 2010/0070364 A1* | 3/2010 | Dugan ............. G06Q 30/02 705/14.43 |
| 2010/0070843 A1 | 3/2010 | Duym |
| 2010/0121630 A1 | 5/2010 | Mende et al. |
| 2010/0153404 A1 | 6/2010 | Ghosh et al. |
| 2010/0179803 A1 | 7/2010 | Sawaf |
| 2010/0211865 A1 | 8/2010 | Fanning et al. |

(56) References Cited

U.S. PATENT DOCUMENTS

| | | |
|---|---|---|
| 2010/0217783 A1 | 8/2010 | Farver et al. |
| 2010/0233996 A1 | 9/2010 | Herz et al. |
| 2010/0242069 A1* | 9/2010 | Jung ............... H04N 5/44543 725/60 |
| 2010/0257457 A1 | 10/2010 | De Goes |
| 2010/0274661 A1 | 10/2010 | Aaltonen et al. |
| 2010/0281008 A1 | 11/2010 | Braunwarth |
| 2010/0305940 A1 | 12/2010 | Dendi et al. |
| 2010/0306402 A1 | 12/2010 | Russell et al. |
| 2010/0312619 A1 | 12/2010 | Ala-Pietila et al. |
| 2011/0010243 A1 | 1/2011 | Wilburn et al. |
| 2011/0022381 A1 | 1/2011 | Gao et al. |
| 2011/0047468 A1 | 2/2011 | Ishizaka |
| 2011/0060998 A1 | 3/2011 | Schwartz et al. |
| 2011/0066469 A1 | 3/2011 | Kadosh |
| 2011/0078626 A1 | 3/2011 | Bachman et al. |
| 2011/0097693 A1 | 4/2011 | Crawford |
| 2011/0191458 A1 | 8/2011 | Cheng et al. |
| 2011/0264736 A1 | 10/2011 | Zuckerberg et al. |
| 2011/0270975 A1 | 11/2011 | Troup |
| 2011/0313754 A1 | 12/2011 | Bastide et al. |
| 2012/0016655 A1 | 1/2012 | Travieso et al. |
| 2012/0022852 A1 | 1/2012 | Tregaskis |
| 2012/0023129 A1 | 1/2012 | Vedula et al. |
| 2012/0042006 A1 | 2/2012 | Kiley et al. |
| 2012/0096366 A1 | 4/2012 | Narla et al. |
| 2012/0131441 A1 | 5/2012 | Jitkoff et al. |
| 2012/0136718 A1 | 5/2012 | Katti |
| 2012/0143816 A1 | 6/2012 | Zhang et al. |
| 2012/0185759 A1 | 7/2012 | Balinsky et al. |
| 2012/0197718 A1 | 8/2012 | Martchenko et al. |
| 2012/0197770 A1 | 8/2012 | Raheja et al. |
| 2012/0197957 A1 | 8/2012 | de Voogd |
| 2012/0203861 A1 | 8/2012 | Flack et al. |
| 2012/0221319 A1 | 8/2012 | Trese |
| 2012/0221407 A1 | 8/2012 | Erasmus et al. |
| 2012/0233665 A1 | 9/2012 | Ranganathan et al. |
| 2012/0266076 A1 | 10/2012 | Lockhart et al. |
| 2012/0330644 A1 | 12/2012 | Giraudy et al. |
| 2012/0330990 A1 | 12/2012 | Chen et al. |
| 2013/0031470 A1 | 1/2013 | Daly, Jr. et al. |
| 2013/0036202 A1 | 2/2013 | Lahav |
| 2013/0054404 A1* | 2/2013 | Garcia ............... G06F 16/958 705/26.3 |
| 2013/0067055 A1 | 3/2013 | Cheng et al. |
| 2013/0091014 A1 | 4/2013 | Kellogg |
| 2013/0097488 A1 | 4/2013 | Coman et al. |
| 2013/0124185 A1 | 5/2013 | Sarr et al. |
| 2013/0124987 A1 | 5/2013 | Lakritz |
| 2013/0144566 A1 | 6/2013 | De Biswas |
| 2013/0151940 A1 | 6/2013 | Bailor et al. |
| 2013/0173247 A1 | 7/2013 | Hodson |
| 2013/0262986 A1 | 10/2013 | Leblond et al. |
| 2013/0304607 A1 | 11/2013 | Costa et al. |
| 2013/0325442 A1 | 12/2013 | Dahlmeier |
| 2013/0326345 A1 | 12/2013 | Haggart et al. |
| 2014/0019625 A1 | 1/2014 | Cheng et al. |
| 2014/0058718 A1 | 2/2014 | Kunchukuttan |
| 2014/0081775 A1 | 3/2014 | Leblond et al. |
| 2014/0082032 A1 | 3/2014 | Leblond et al. |
| 2014/0087760 A1* | 3/2014 | Bennett ............... H04W 4/046 455/456.3 |
| 2014/0114864 A1 | 4/2014 | Babich et al. |
| 2014/0142917 A1 | 5/2014 | D'Penha |
| 2014/0142918 A1 | 5/2014 | Dotterer |
| 2014/0173414 A1 | 6/2014 | Chan et al. |
| 2014/0181013 A1 | 6/2014 | Micucci et al. |
| 2014/0229257 A1 | 8/2014 | Reistad et al. |
| 2014/0250369 A1 | 9/2014 | Mitnick et al. |
| 2014/0278342 A1 | 9/2014 | Shoshan et al. |
| 2014/0297252 A1 | 10/2014 | Prasad et al. |
| 2014/0297759 A1 | 10/2014 | Mody |
| 2014/0298483 A1 | 10/2014 | Kato |
| 2014/0304080 A1* | 10/2014 | Yilmaz ............... G09F 21/04 705/14.63 |
| 2014/0310229 A1 | 10/2014 | Lahav |
| 2014/0351053 A1* | 11/2014 | Link, II ............ G06F 17/30241 705/14.58 |
| 2014/0358519 A1 | 12/2014 | Mirkin |
| 2014/0358524 A1 | 12/2014 | Papula |
| 2014/0365201 A1 | 12/2014 | Gao |
| 2015/0040000 A1 | 2/2015 | Rice et al. |
| 2015/0051896 A1 | 2/2015 | Simard |
| 2015/0052424 A1 | 2/2015 | Sikchi et al. |
| 2015/0074518 A1 | 3/2015 | Rumsey et al. |
| 2015/0149885 A1 | 5/2015 | Homer et al. |
| 2015/0149886 A1 | 5/2015 | Homer et al. |
| 2015/0186362 A1 | 7/2015 | Li |
| 2015/0188961 A1* | 7/2015 | Ricci ............... H04L 63/10 709/219 |
| 2015/0213259 A1 | 7/2015 | Du et al. |
| 2015/0213363 A1 | 7/2015 | Lahav |
| 2015/0254732 A1 | 9/2015 | Snyder |
| 2015/0310504 A1* | 10/2015 | Potter ............... G06Q 30/0276 705/14.66 |
| 2016/0248785 A1 | 8/2016 | Petry et al. |
| 2016/0275057 A1 | 9/2016 | Dendi et al. |
| 2017/0124069 A1 | 5/2017 | Bondarchuk et al. |
| 2017/0149683 A1 | 5/2017 | Cheng et al. |
| 2017/0337614 A1 | 11/2017 | Costa et al. |
| 2018/0314674 A1 | 11/2018 | Homer et al. |
| 2019/0065514 A1 | 2/2019 | Siddiquee et al. |
| 2019/0158567 A1 | 5/2019 | Siddiquee et al. |

FOREIGN PATENT DOCUMENTS

| | | |
|---|---|---|
| AU | 5202299 A | 10/1999 |
| CA | 2221506 A1 | 12/1996 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| EP | 0830774 A2 | 3/1998 |
| EP | 1128301 A2 | 8/2001 |
| EP | 1128302 A2 | 8/2001 |
| EP | 1128303 A2 | 8/2001 |
| EP | 1170680 | 1/2002 |
| EP | 0803103 A1 | 2/2002 |
| EP | 1235177 A2 | 8/2002 |
| EP | 0734556 B1 | 9/2002 |
| EP | 0830774 B1 | 10/2004 |
| EP | 1489523 A2 | 12/2004 |
| EP | 2299369 A1 | 3/2011 |
| EP | 2668599 | 12/2013 |
| EP | 2668626 | 12/2013 |
| EP | 2678814 | 1/2014 |
| EP | 2896007 A1 | 7/2015 |
| EP | 2896008 A1 | 7/2015 |
| GB | 2241359 A | 8/1991 |
| JP | H10509543 A | 9/1998 |
| JP | H11507752 A | 7/1999 |
| JP | 2001117847 | 4/2001 |
| JP | 2001136583 A | 5/2001 |
| JP | 3190881 B2 | 7/2001 |
| JP | 3190882 B2 | 7/2001 |
| JP | 2001188992 | 7/2001 |
| JP | 2001350790 | 12/2001 |
| JP | 3260693 B2 | 2/2002 |
| JP | 2002073677 | 3/2002 |
| JP | 2002132822 A | 5/2002 |
| JP | 3367675 B2 | 1/2003 |
| JP | 2003032660 | 1/2003 |
| JP | 2003157402 A | 5/2003 |
| JP | 2003216608 A * | 7/2003 |
| JP | 2004538542 A | 12/2004 |
| JP | 2005056080 | 3/2005 |
| JP | 2005174120 A | 6/2005 |
| JP | 2005267535 A | 9/2005 |
| JP | 3762882 B2 | 4/2006 |
| JP | 2006216073 A | 8/2006 |
| JP | 2006260329 A | 9/2006 |
| JP | 2007042127 A | 2/2007 |

(56) References Cited

FOREIGN PATENT DOCUMENTS

| | | |
|---|---|---|
| JP | 2008027265 | 2/2008 |
| JP | 2009020845 | 1/2009 |
| JP | 2009518761 A | 5/2009 |
| JP | 2009301480 A | 12/2009 |
| JP | 4485548 B2 | 6/2010 |
| JP | 2010152588 | 7/2010 |
| JP | 2011002905 A | 1/2011 |
| JP | 4669373 B2 | 4/2011 |
| JP | 4669430 B2 | 4/2011 |
| JP | 5952307 B2 | 7/2016 |
| JP | 5952312 B2 | 7/2016 |
| JP | 6138054 | 6/2017 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9819224 A2 | 5/1998 |
| WO | WO9952626 A1 | 10/1999 |
| WO | WO2002039318 A1 | 5/2002 |
| WO | WO20030081441 | 2/2003 |
| WO | WO2007068123 A1 | 6/2007 |
| WO | WO20070118424 A1 | 10/2007 |
| WO | WO2010062540 A1 | 6/2010 |
| WO | WO2010062542 A1 | 6/2010 |
| WO | WO2012101240 | 8/2012 |
| WO | WO2012101243 | 8/2012 |
| WO | WO2012113791 | 8/2012 |
| WO | WO2013144358 | 10/2013 |
| WO | WO2013167734 | 11/2013 |
| WO | WO2014041148 | 3/2014 |
| WO | WO2014041149 | 3/2014 |

OTHER PUBLICATIONS

XP007905525, The Technical Aspects Identified in the Present Application are considered part of common general knowledge. Due to their notoriety no documentary evidence is found to be required. Official Journal Nov. 2007, p. 592.
"The GNU Make Manual", Version 3.79, edition 0.55, Apr. 2000, Free Software Foundation, Inc.
Rational Software Corporation, "Introduction to ClearCase", Dec. 1999, Rational ClearCase, Release 4.0.
Rational Software Corporation, "Administering ClearCase", Rational ClearCase Release 4.0, 1999.
Challenger et al., "A Scalable System for Consistently Caching Dynamic Web Data", INFOCOM '99. Eighteenth Annual Joint Conference of the IEEE Computer and Communications Societies. Proceedings. IEEE, Mar. 21-25, 1999, pp. 294-303, vol. 1.
Challenger et al., "A Publishing System for Efficiently Creating Dynamic Web Content", INFOCOM 2000. Nineteenth Annual Joint Conference of the IEEE Computer and Communications Societies. Proceedings. IEEE, Mar. 26-30, 2000, vol. 2.
Croll et al., "Content Management—The Users Requirements", International Broadcasting Convention, Conference Publication No. 447, Sep. 12-16, 1997.
IDIOM, Inc. "WorldServer 2 White Paper", 2000, 19 pages.
Market Wire. "VerticalNet Selects Uniscape as Globalization Provider to Speed Global Expansion", Jun. 2000, <www.findarticles.com/p/articles/mi_pwwi/is_200006/ai_mark01011558/print> accessed on Oct. 1, 2005, 2 pages.
PRNewsWire and NEWSdesk. "Personify Selects Uniscape to Enable Ebusiness Solutions for Global Markets", Aug. 30, 2000, <www.findwealth.com/personify-selects-uniscape-to-enable-180593pr.html> accessed on Oct. 1, 2005, 2 pages.
Uniscape, Inc. "Uniscape, Inc. Home Page", publicly posted Feb. 20, 1999, <web.archive.org/web/19990220195249//http://www.uniscape-inc.com/> accessed on Oct. 1, 2005, 2 pages.
Business Wire. "Uniscape Introduces Pilot Program to Provide Multilingual Website Management Solutions," Feb. 11, 1999, <www.findarticles.com/p/articles/mi_m0EIN/is_1999_Feb_11/11/ai_53852378> accessed on May 9, 2011, 1 page.
Business Wire. "Uniscape Announces New Solution for Automating Management of Software Localization Process," Aug. 17, 1998, <www.findarticles.com/p/articles/mi_m0EIN/is_1998_August_17/ai_21090247> accessed on Oct. 1, 2005, 2 pages.
Market Wire. "Cephren Relies on Uniscape During Rapid Global eBusiness Expansion," Oct. 18, 2000, <www.marketwire.com/mw/iwpr?id=18115&cat=te> accessed on Oct. 1, 2005, 2 pages.
My Yahoo—RSS Headlines Module—"Frequently Asked Questions," Jan. 24, 2004, <http://web.archive.org/web/20040124175747/http://my.yahoo.com/s/rss-f aq. htm1> accessed on Dec. 17, 2008, 4 pages.
Krishnan, "Unmittelbare Ergenbnisse Noch Schneller: Google Vorschau—Der Google Produkt-Kompass," Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages.
Unidex, Inc.: "XML Convert," Aug. 4, 2007, <http://www.unidex.com/xflat.htm> accessed on Apr. 5, 2012, 1 page.
Wikipedia—"SOAP," Jan. 22, 2011, <http://en.wikipedia.org/w/index.php?title=SOAP&oldid=409349976> accessed on Apr. 4, 2012, 5 pages.
Mutz et al., "User-Agent Display Attributes," HTTP Working Group, Nov. 26, 1996, 6 pages.
International Search Report and Written Opinion dated Jan. 8, 2014 in application No. PCT/EP2013/069078, filed Sep. 14, 2013.
International Search Report and Written Opinion dated Jan. 8, 2014 in application No. PCT/EP2013/069077, filed Sep. 14, 2013.
Colligan et al.; Special Edition Using Microsoft Office FrontPage 2003; 2004; Que Publishing; pp. 50-91 and 323-326.
"Highlight;" Microsoft Computer Dictionary; May 1, 2002; Microsoft Press; p. 320.
First Examination Report dated Jun. 17, 2014 in European Patent Convention application No. 12707723.8, filed Feb. 21, 2012, pp. 1, 3-6.
Summons to Attend Oral Proceedings mailed Feb. 11, 2015 in European Patent Convention application No. 1270772.8, filed Feb. 21, 2012.
International Search Report and Written Opinion dated Oct. 23, 2013 in Patent Cooperation Treaty application No. PCT/EP2013/056842, filed Mar. 29, 2013.
Final Office Action, dated Jul. 1, 2014, U.S. Appl. No. 13/016,989, filed Jan. 29, 2011.
Non-Final Office Action, dated Mar. 2, 2015, U.S. Appl. No. 13/016,989, filed Jan. 29, 2011.
Non-Final Office Action, dated Sep. 11, 2014, U.S. Appl. No. 13/016,988, filed Jan. 29, 2011.
Non-Final Office Action, dated May 9, 2014, U.S. Appl. No. 13/436,656, filed Mar. 30, 2012.
Final Office Action, dated Dec. 4, 2014, U.S. Appl. No. 13/436,656, filed Mar. 30, 2012.
Non-Final Office Action, dated May 6, 2014, U.S. Appl. No. 13/609,293, filed Sep. 11, 2012.
Final Office Action, dated Mar. 18, 2015, U.S. Appl. No. 13/609,293, filed Sep. 11, 2012.
Non-Final Office Action, dated Feb. 26, 2015, U.S. Appl. No. 13/886,194, filed May 2, 2013.
Final Office Action, dated Apr. 6, 2015, U.S. Appl. No. 13/016,988, filed Jan. 29, 2011.
Final Office Action, dated Sep. 23, 2015, U.S. Appl. No. 13/016,989, filed Jan. 29, 2011.
Advisory Action, dated Feb. 9, 2016, U.S. Appl. No. 13/016,989, filed Jan. 29, 2011.
Non-Final Office Action, dated Jun. 8, 2015, U.S. Appl. No. 13/436,656, filed Mar. 30, 2012.
Final Office Action, dated Jan. 7, 2016, U.S. Appl. No. 13/436,656, Mar. 30, 2012.
Advisory Action, dated Jun. 29, 2015, U.S. Appl. No. 13/609,293, filed Sep. 11, 2012.
Non-Final Office Action, dated Dec. 14, 2015, U.S. Appl. No. 13/886,194, filed May 2, 2013.
Non-Final Office Action, dated May 19, 2015, U.S. Appl. No. 13/886,199, filed May 2, 2013.

(56) References Cited

OTHER PUBLICATIONS

Final Office Action, dated Jan. 19, 2016, U.S. Appl. No. 13/886,199, filed May 2, 2013.
Non-Final Office Action, dated Sep. 29, 2015, U.S. Appl. No. 14/023,384, filed Sep. 10, 2013.
Non-Final Office Action, dated Oct. 30, 2015, U.S. Appl. No. 14/091,329, filed Nov. 26, 2013.
Notice of Allowance dated May 24, 2016 in Japanese Patent Application 2013-550888 filed Jan. 27, 2012, pp. 1-3.
Non-Final Office Action, dated May 11, 2016, U.S. Appl. No. 13/016,988, filed Jan. 29, 2011.
Advisory Action, dated Mar. 8, 2016, U.S. Appl. No. 13/436,656, filed Mar. 30, 2012.
Notice of Allowance, dated May 4, 2016, U.S. Appl. No. 13/436,656, filed Mar. 30, 2012.
Non-Final Office Action, dated May 3, 2016, U.S. Appl. No. 13/609,293, filed Sep. 11, 2012.
Final Office Action, dated May 3, 2016, U.S. Appl. No. 14/023,384, filed Sep. 10, 2013.
Final Office Action, dated Jun. 14, 2016, U.S. Appl. No. 14/091,329, filed Nov. 26, 2013.
"Inheritance (object-oriented programming)", archived Wikipedia on Sep. 4, 2011, http://en.wikipedia.org/w/index.php?title=Inheritance_(object-oriented_programming)&oldid=448382925, pp. 1-7.
Result of Consultation mailed May 28, 2015 in European Patent Convention application No. 12707723.8, filed Feb. 21, 2012, pp. 1-3.
Decision to Refuse dated Jun. 29, 2015 in European Patent Application 12707723.8 filed Feb. 21, 2012, pp. 1-30.
Minutes of Oral Proceeding mailed Jun. 29, 2015 in European Patent Application 12707723.8 filed Feb. 21, 2012, pp. 1-8.
Preview; Feb. 26, 2011; Dictionary.com; pp. 1-2.
Edgar; "Why Do Browsers Display My Site Differently?" Jun. 3, 2009 (updated Nov. 2010); matthewedgar.net; pp. 1-5.
Office Action dated Jan. 5, 2016 in Japanese Patent Application 2013-550887 filed Jul. 26, 2013.
Office Action dated Dec. 22, 2015 in Japanese Patent Application 2013-550888 filed Jan. 27, 2012.
Office Action dated Feb. 9, 2016 in Japanese Patent Application 2016-554869 filed Feb. 21, 2012.
Notice of Allowance dated May 24, 2016 in Japanese Patent Application 2013-554869 filed Feb. 21, 2012, pp. 1-3.
Non-Final Office Action, dated Nov. 28, 2016, U.S. Appl. No. 13/891,029, filed May 9, 2013.
Non-Final Office Action, dated Nov. 28, 2016, U.S. Appl. No. 14/023,384, filed Sep. 10, 2013.
Wikipedia; "Serialization"; Nov. 14, 2013; 10 pages; https://web.archive.org/web/20131114152415/http://en.wikipedia.org/wiki/Serialization.
Microsoft, MSDN; "Serialization .NET Framework 4.5"; Jan. 10, 2013; 2 pages; https://web.archive.org/web/20130110102559/http://msdn.microsoft.com/en-us/library/7ay27kt9(v=vs.110).aspx.
European Patent Application No. 12703483.3, "Office Action," dated Jan. 25, 2017, 7 pages.
Advisory Action, dated Jan. 13, 2017, U.S. Appl. No. 14/093,015, filed Nov. 28, 2013.
Non-Final Office Action, dated Jan. 18, 2017, U.S. Appl. No. 14/091,329, filed Nov. 26, 2013.
Final Office Action, dated Jan. 24, 2017, U.S. Appl. No. 13/886,194, filed May 2, 2013.
Advisory Action, dated Feb. 9, 2017, U.S. Appl. No. 14/093,015, filed Nov. 28, 2013.
Non-Final Office Action, dated Sep. 28, 2016, U.S. Appl. No. 13/016,989, filed Jan. 29, 2011.
Notice of Allowance, dated Nov. 7, 2016, U.S. Appl. No. 13/609,293, filed Sep. 11, 2012.
Final Office Action, dated Oct. 31, 2016, U.S. Appl. No. 13/886,194, filed May 2, 2013.
Final Office Action, dated Nov. 3, 2016, U.S. Appl. No. 14/093,015, filed Nov. 28, 2013.
Japan Patent Application No. 2013-550887, "Office Action," dated Oct. 4, 2016, 4 pages [8 pages including translation].
European Patent Application No. 12703482.5, "Office Action," dated Sep. 6, 2016, 4 pages.
"Notice of Allowance," Japan Patent Application No. 2013-550887, dated Apr. 11, 2017, 3 pages.
Schafer, Ben J. et al., "Recommender Systems in E-Commerce," Proceedings of the 1st ACM conference on Electronic Commerce (EC '99), ACM, New York, NY, 1999, pp. 158-166.
Non-Final Office Action, dated Jul. 11, 2017, U.S. Appl. No. 15/423,305, filed Feb. 2, 2017.
Non-Final Office Action, dated Jul. 26, 2017, U.S. Appl. No. 13/886,199, filed May 2, 2013.
Non-Final Office Action, dated Aug. 8, 2017, U.S. Appl. No. 13/016,989, filed Jan. 29, 2011.
Summons to Attend Oral Proceedings, European Patent Application No. 12703483.3, Nov. 30, 2017, 11 pages.
"Web analytics," Wikipedia [online], Jan. 27, 2001 [retrieved on Sep. 11, 2017], Retrieved from the Internet: <URL: https://en.wikipedia.org/w/index.php?title=Web_analytics&oldid=410384013>, 11 pages.
"Examining Division Preliminary Opinion," European Patent Application No. 12703483.3, Apr. 30, 2018, 9 pages.
"Decision to Refuse," European Patent Application No. 12703483.3, dated Jun. 19, 2018, 24 pages.
"Minutes of Oral Proceeding", European Patent Application No. 12703483.3, Jun. 19, 2018, 4 pages.
"Summons to Attend Oral Proceedings," European Patent Application No. 12703482.5, Feb. 14, 2018, 10 pages.
"Office Action," European Patent Application No. 13776975.8, dated Jun. 4, 2018, 11 pages.
"Decision to Refuse," European Patent Application No. 12703482.5, dated Sep. 17, 2018, 4 pages.
Leblond, Dominique, "Blueprinting of Multimedia Assets", U.S. Appl. No. 13/619,591, filed Sep. 14, 2012, 40 pages.
"Summons to Attend Oral Proceedings," European Patent Application No. 13776975.8, Jul. 2, 2019, 18 pages.
Hasegawa et al., "Multilingual Disaster Information System: Information Delivery Using Graphic Text for Mobile Phones," AI & Soc 19, 2005, pp. 265-278.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on

(56) References Cited

OTHER PUBLICATIONS

Statistical Machine Translation. Retrieved from: http://aclanthology.info/volumes/proceedings-of-the-seventh-workshop-onstatistical-machine-translation.

Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.

Gonzalez-Rubio et al. "PRHLT Submission to the WMT12 Quality Estimation Task" [W12- 3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.

Hardmeier et al. "Tree Kernels for Machine Translation Quality Estimation" [W12-3112] Proceedings of the Seventh Workshop on Statistical Machine Translation, Jun. 7, 2012, pp. 109-113. Retrieved from: http://aclanthology.info/volumes/proceedings-of-the-seventh-workshop-onstatistical-machine-translation.

Langlois et al. "Loria System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.

Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.

Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.

Popovic, Maja. "Morpheme—and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.

Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.

Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.

Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.

Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.

"Best Practices—Knowledge Base," Lilt website [online], Mar. 6, 2017 [retrieved on Oct. 19, 2017], Retrieved from the Internet: <https://lilt.com/kb/translators/best-practices>, 2 pages.

"Data Security—Knowledge Base," Lilt website [online], Oct. 14, 2016 [retrieved on Oct. 19, 2017], Retrieved from the Internet: <https://filt.com/kb/security>, 1 pages.

"Data Security and Confidentiality," Lilt website [online], 2017 [retrieved on Oct. 19, 2017], Retrieved from the Internet: <https://lilt.com/security>, 7 pages.

"Memories—Knowledge Base," Lilt website [online], Jun. 7, 2017 [retrieved on Oct. 19, 2017], Retrieved from the Internet: <https://lilt.com/kb/project-managers/memory>, 4 pages.

"Memories (API)—Knowledge Base," Lilt website [online], Jun. 2, 2017 [retrieved on Oct. 19, 2017], Retrieved from the Internet: <https://lilt.com/kb/api/memories>, 1 page.

"Quoting—Knowledge Base," Lilt website [online], Jun. 7, 2017 [retrieved on Oct. 19, 2017], Retrieved from the Internet: <https://lilt.com/kb/project-managers/quoting>, 4 pages.

"The Editor—Knowledge Base," Lilt website [online], Aug. 15, 2017 [retrieved on Oct. 19, 2017], Retrieved from the Internet: <https://lilt.com/kb/translators/editor>, 5 pages.

"Training Lilt—Knowledge Base," Lilt website [online], Oct. 14, 2016 [retrieved on Oct. 20, 2017], Retrieved from the Internet: <https://lilt.com/kb/troubleshooting/training-lilt>, 1 page.

"What is Lilt—Knowledge Base," Lilt website [online], Dec. 15, 2016 [retrieved on Oct. 19, 2017], Retrieved from the Internet: <https://lilt.com/kb/what-is-lilt>, 1 page.

"Getting Started—Knowledge Base," Lilt website [online], Apr. 11, 2017 [retrieved on Oct. 20, 2017], Retrieved from the Internet: <https://lilt.com/kb/translators/getting-started>, 2 pages.

"The Lexicon—Knowledge Base," Lilt website [online], Jun. 7, 2017 [retrieved on Oct. 20, 2017], Retrieved from the Internet: <https://lilt.com/kb/translators/lexicon>, 4 pages.

"Simple Translation—Knowledge Base," Lilt website [online], Aug. 17, 2017 [retrieved on Oct. 20, 2017], Retrieved from the Internet: <https://lilt.com/kb/api/simple-translation>, 3 pages.

"Split and Merge—Knowledge Base," Lilt website [online], Oct. 14, 2016 [retrieved on Oct. 20, 2017], Retrieved from the Internet: <https://lilt.com/kb/translators/split-merge>, 4 pages.

"Lilt API _ API Reference," Lilt website [online], retrieved on Oct. 20, 2017, Retrieved from the Internet: <https://lilt.com/docs/api>, 53 pages.

"Automatic Translation Quality—Knowledge Base", Lilt website [online], Dec. 1, 2016, retrieved on Oct. 20, 2017, Retrieved from the Internet: <https://lilt.com/kb/evaluation/evaluate-mt>, 4 pages.

"Projects—Knowledge Base,"Lilt website [online], Jun. 7, 2017, retrieved on Oct. 20, 2017, Retrieved from the Internet: <https://lilt.com/kb/project-managers/projects>, 3 pages.

"Getting Started with lilt," Lilt website [online], May 30, 2017, retrieved on Oct. 20, 2017, Retrieved from the Internet: <https://lilt.com/kb/api/lilt-js>, 6 pages.

"Interactive Translation—Knowledge Base," Lilt website [online], Aug. 17, 2017, retrieved on Oct. 20, 2017, Retrieved from the Internet: <https://lilt.com/kb/api/interactive-translation>, 2 pages.

Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information_retrieval.

Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.

Sethy et al., "Building Topic Specific Language Models Fromwebdata Using Competitive Models," Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.

Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.

Business Wire, "Language Weaver Introduces User-Managed Customization Tool," Oct. 25, 2005, 3 pages. Retrieved from http: ProQuest.

Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.

(56) References Cited

OTHER PUBLICATIONS

Potet et al., "Preliminary Experiments on Using Users' Post-Editions to Enhance a SMT System," Proceedings of the European Association for Machine Translation (EAMT), May 2011, pp. 161-168. Retreived from Retrieved at http://www.mt-archive.info/EAMT-2011-Potet.pdf.
Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.
Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.
Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.
Levenberg et al. "Stream-based Translation Models for Statistical Machine Translation" Human Language Technologies: The 2010 Annual Conference of the North American Chapter of the ACL, Dec. 31, 2010, pp. 394-402.
Lagarda et al. "Statistical Post-Editing of a Rule Based Machine Translation System" Proceedings of NAACL HLT 2009: Short Papers, Jun. 2009, pp. 217-220.
Ehara, "Rule Based Machine Translation Combined with Statistical Post Editor for Japanese to English Patent Translation," MT Summit XI, 2007, pp. 13-18.
Bechara et al. "Statistical Post-Editing for a Statistical MT System" Proceedings of the 13th Machine Translation Summit, 2011, pp. 308-315.

\* cited by examiner

SYSTEMS, METHODS, AND MEDIA FOR EXECUTING AND OPTIMIZING ONLINE MARKETING INITIATIVES

This nonprovisional patent application is related to U.S. patent application Ser. No. 13/016,988 filed on Jan. 29, 2011, titled "SYSTEMS, METHODS, AND MEDIA FOR MANAGING AMBIENT ADAPTABILITY OF WEB APPLICATIONS AND WEB SERVICES" and U.S. patent application Ser. No. 13/016,989 filed on Jan. 29, 2011, titled "SYSTEMS, METHODS, AND MEDIA FOR WEB CONTENT MANAGEMENT"—all of which are all hereby incorporated herein by reference in their entirety including all references cited therein.

FIELD OF THE TECHNOLOGY

The present technology relates generally to online marketing initiatives, and more specifically, but not by way of limitation, to systems, methods, and media for the execution and optimization of online marketing initiatives.

BACKGROUND

Online marketing may be difficult at times because generating web traffic or user interest online for a particular product or service can be challenging, given the volume of possible purchase options, advertisements and web sites that are available to a user online.

SUMMARY OF THE TECHNOLOGY

According to some embodiments, the present technology is directed to methods for at least one of generating, executing, evaluating and optimizing the performance of online marketing initiatives. The methods may include: (a) receiving, via a web server, input corresponding to one or more marketing initiatives, each of the one or more online marketing initiatives including at least one asset; (b) generating, via the web server, one or more online marketing initiatives from the received input; (c) providing the one or more online marketing initiatives to one or more presentation servers for publishing the one or more marketing initiative to one or more platforms; (d) receiving, from the one or more presentation servers, tracking data for at least one of the one or more marketing initiatives; (e) comparing the tracking data to one or more performance metrics to determine the performance of the at least one marketing initiative; and (f) storing at least one of the tracking data and the performance metric in a database coupled to at least one of the web server and the one or more presentation servers.

According to other embodiments, the present technology may be directed to systems for at least one of generating, executing, evaluating and optimizing the performance of online marketing initiatives that includes: (a) a memory for storing executable instructions for evaluating the performance of online marketing initiatives; (b) a processor configured to execute the instructions stored in the memory to: (a) receiving, via a web server, input corresponding to one or more marketing initiatives, each of the one or more online marketing initiatives including at least one entry asset; (b) generating, via the web server, one or more online marketing initiatives from the received input; (c) publishing the one or more online marketing initiatives to one or more presentation servers; (d) receiving, from the one or more presentation servers, tracking data for at least one of the one or more marketing initiatives; (e) comparing the tracking data to one or more performance metrics to determine the performance of the at least one marketing initiative; and (f) storing at least one of the tracking data and the performance metric in a database coupled to at least one of the web server and the one or more presentation servers.

According to some embodiments, the present technology may be directed to non-transitory executable storage medium having a computer program embodied thereon, the computer program executable by a processor in a computing system to perform a method for at least one of generating, executing, evaluating and optimizing the performance of online marketing initiatives that includes: (a) receiving, via a web server, input corresponding to one or more marketing initiatives, each of the one or more online marketing initiatives including at least one asset; (b) generating, via the web server, one or more online marketing initiatives from the received input; (c) providing the one or more online marketing initiatives to one or more presentation servers for publishing the one or more marketing initiative to one or more platforms; (d) receiving, from the one or more presentation servers, tracking data for at least one of the one or more marketing initiatives; (e) comparing the tracking data to one or more performance metrics to determine the performance of the at least one marketing initiative; and (f) storing at least one of the tracking data and the performance metric in a database coupled to at least one of the web server and the one or more presentation servers.

In other embodiments, the present technology may be directed to methods that include: (a) receiving, from one or more presentation servers, tracking data for one or more online marketing initiatives, each of the one or more online marketing initiatives including at least one asset; (b) comparing the tracking data to one or more performance metrics to determine the performance of the at least one marketing initiative; and (c) storing at least one of the tracking data and the one or more performance metrics in a database.

DETAILED DESCRIPTION OF EXEMPLARY EMBODIMENTS

Figure 1:
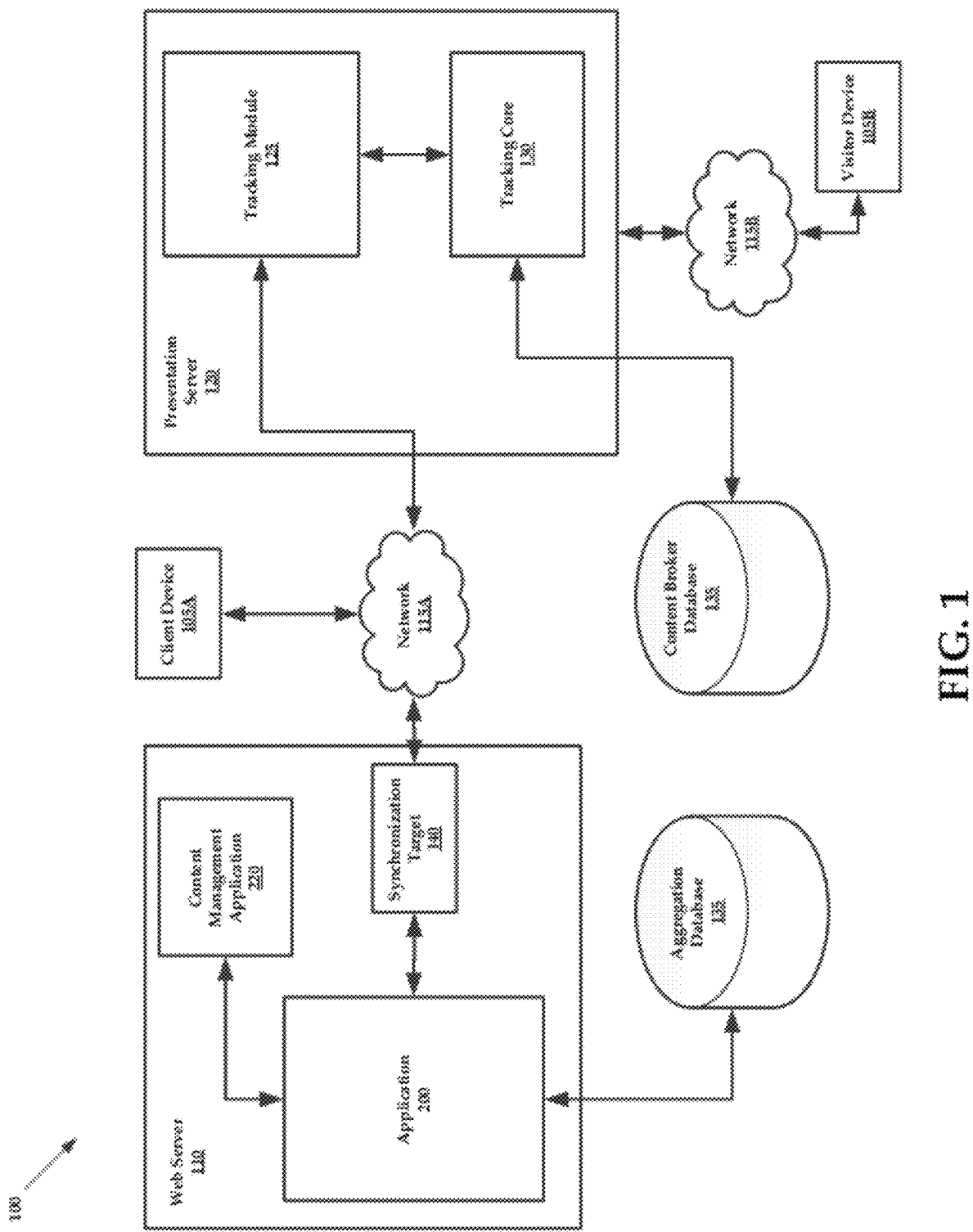
FIG. 1 is a schematic diagram of an exemplary architecture of a system for generating, executing, evaluating and optimizing the performance of online marketing initiatives. The system may be utilized to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Generally speaking, the systems and methods provided herein may be adapted to generate online marketing initiatives, to evaluate the performance of the same and to bring about changes in the online marketing initiatives to improve and/or optimize performance. Broadly speaking, the systems and methods provided herein may allow end users to create online marketing initiatives that include one or more assets, track visitors and the actions they perform on assets, and process and display statistical data about the progress of an online marketing initiative.

Exemplary online marketing explorer interfaces provided herein may offer end users a mechanism for building online marketing initiatives that are consistent across a plurality of platforms. It will be understood that the term "platform" may be understood to include RSS and news feeds, web content aggregator, web engine, one or more web pages, social networking medias, search engine, online ad engine, banner engine, online news groups, forums, and web applications (both standard and mobile), and any combinations thereof—just to name a few. Therefore, end users may effectively and simultaneously create online marketing initiatives for a plurality of platforms in one convenient application.

In addition to creating online marketing initiatives across a plurality of platforms, the systems and methods may allow end users to create localized online marketing initiatives for a plurality of languages and/or countries. These localized online marketing initiatives may inherit portions of a global marketing framework, but may be customized to target a particular group or groups of consumers.

The online marketing explorer allows end users to quickly and efficiently build online marketing initiatives from predefined assets such as banners, hyperlinks, web pages, and the like. Each of the marketing initiatives include one or more goals that are functionally related to one or more assets such that visitors accessing an asset associated with the online marketing initiatives are directed to the one or more goals. In some embodiments, the goals may include a landing page, one or more videos, one or more images, and the like. End users may associate one or more assets with a goal via linking within the online marketing explorer interface, as will be discussed in greater detail herein.

Stated otherwise, the online marketing initiatives of the present technology may be generally described as including persuasive content (e.g., assets). The performance of online marketing initiatives may be measured by tracking visitor data relative to the assets of the online marketing initiatives, the online marketing initiatives themselves, information corresponding to the visitors, and combinations thereof.

It will be understood that the performance of an online marketing initiative may be generally referred to as a "performance metric." End users may define one or more performance metrics for each online marketing initiative that allow the end user to determine and gather statistical data relative to the online marketing initiative. For example, an end user may want to determine how many click-throughs a particular interactive banner advertisement is generating in a given period of time.

Alternatively, the end user may wish to determine an aggregate number of unique visitors that are accessing the interactive banner advertisement in a given period of time. Performance metrics may also be collected and evaluated in light of demographic information gather from the visitors utilizing the interactive banner advertisement. One of ordinary skill in the art will appreciate that many other performance metrics that correspond to the performance of online marketing initiative may be gathered utilizing the systems and methods of the present technology. Moreover, as performance metrics are end user defined, the performance metrics are not limited to any particular configuration or requirements and may depend upon the unique needs of the end user.

Assets may be received from a global marketing framework (also known as a "Content Blueprint") associated with a content management application, as described in greater detail with regard to U.S. patent application Ser. No. 13/016, 989 filed on Jan. 29, 2011, titled "SYSTEMS, METHODS, AND MEDIA FOR WEB CONTENT MANAGEMENT". Moreover, the online marketing explorer provides end users with the ability to modify the contents of an asset. For example, the online marketing explorer may be operatively associated with the content management application such that end users may utilize portions of the functionalities of the content management application from inside the online marketing explorer.

Once a marketer has established one or more online marketing initiatives, the one or more online marketing initiatives may be provided to a plurality of presentation servers for publishing. For example, online marketing initiatives designed for social networking medias (e.g., text and hyperlink assets) are provided to the appropriate social networking medias and online marketing initiatives designed for deployment on a retail website (e.g., an interactive banner asset) may be provided to the appropriate web server hosting the retail website, or may be published on another web server and reference to the interactive banner asset may be embedded into the retail website.

Over time, visitor interaction with the online marketing initiatives is monitored by evaluating each of the presentation servers for various types of visitor interactions relative to the online marketing initiatives associated therewith. Evaluation of the visitor interactions may yield tracking data that corresponds to which of the assets of the online marketing initiatives the visitors interacted with, or whether an entry asset successfully led visitors to the at least one goal asset. It will be understood that the systems and methods of the present technology may be adapted to monitor and evaluate any type of visitor information generated by the presentation servers.

The systems and methods may then generate performance reports corresponding to the whether the online marketing initiatives are achieving their individual goals. Additionally, systems and methods may be adapted to provide these performance reports in a readily ascertainable format such as a visual representation that utilizes colors or shapes to indicate performance.

The performance reports or tracking data generated by the presentation servers may be utilized by the end users to easily identify successful marketing campaigns and modify or suspend unsuccessful marketing campaigns. These and other functional and implementational details regarding the systems and methods of the present technology will be described in greater detail below with reference to FIGS. 1-7.

Referring to FIG. 1, a schematic diagram of an exemplary architecture 100 for practicing aspects of the present technology is depicted. Generally speaking, the architecture may include a plurality of client devices 105A (shown herein as a single client device 105A) that are communicatively coupled with a web server 110 via a network 115A. The network 115A may include a public computer network such as the Internet, or a private computer network such as a wireless telecommunication network, wide area network, or local area network, or a combination of networks.

The web server 110 may be adapted to evaluating the performance of online marketing initiatives. For example, the web server 110 may be adapted to generate one or more user interfaces that may be utilized by end users (e.g., marketers, content managers, and so forth) to input information corresponding to online marketing initiatives that may be utilized to generate one or more marketing initiatives. The marketing initiatives may be created for utilization across a wide array of platforms such as web pages, social networking media, and so forth.

Once the marketing initiatives have been generated, the marketing initiatives may be provided to a plurality of presentation servers 120 (shown herein as a single presentation server 120 for the purposes of brevity) via the network 115A. The marketing initiatives may then be published or made available to visitor devices the client systems 105A.

Tracking data may be obtained from visitor devices 105B from visitor interaction with the presentation servers 120 via one or more types of tracking mechanisms such as cookies resident on the visitor devices 105B and/or server monitors, all of which will be discussed in greater detail below. It will be understood that the visitor devices 105B may communicatively connect with the presentations server 120 via a network 115B, which may include a public network such as the Internet.

While the architecture 100 has been disclosed as including the web server 110 and the presentation server 120, one of ordinary skill in the art with the present disclosure before them will appreciate that the architecture may include any number or configuration of web servers and presentation servers, which may include distributed computing systems such as a cloud computing system (not shown).

Both the client device 105A and visitor device 105B may include any general purpose computing system that may implement a web browser application or other suitable applications adapted to request and provide information (such as web content) to and from a web server 110. A suitable example of the client device 105A and the visitor device 105B may include the computing system 700 disclosed with reference to FIG. 7. Additionally, the web servers 110 and the presentation servers 120 may also include many of the components of computing system 700, although specific implementational and structural details regarding the web servers 110 and the presentation servers 120 will be provided below.

Figure 2:
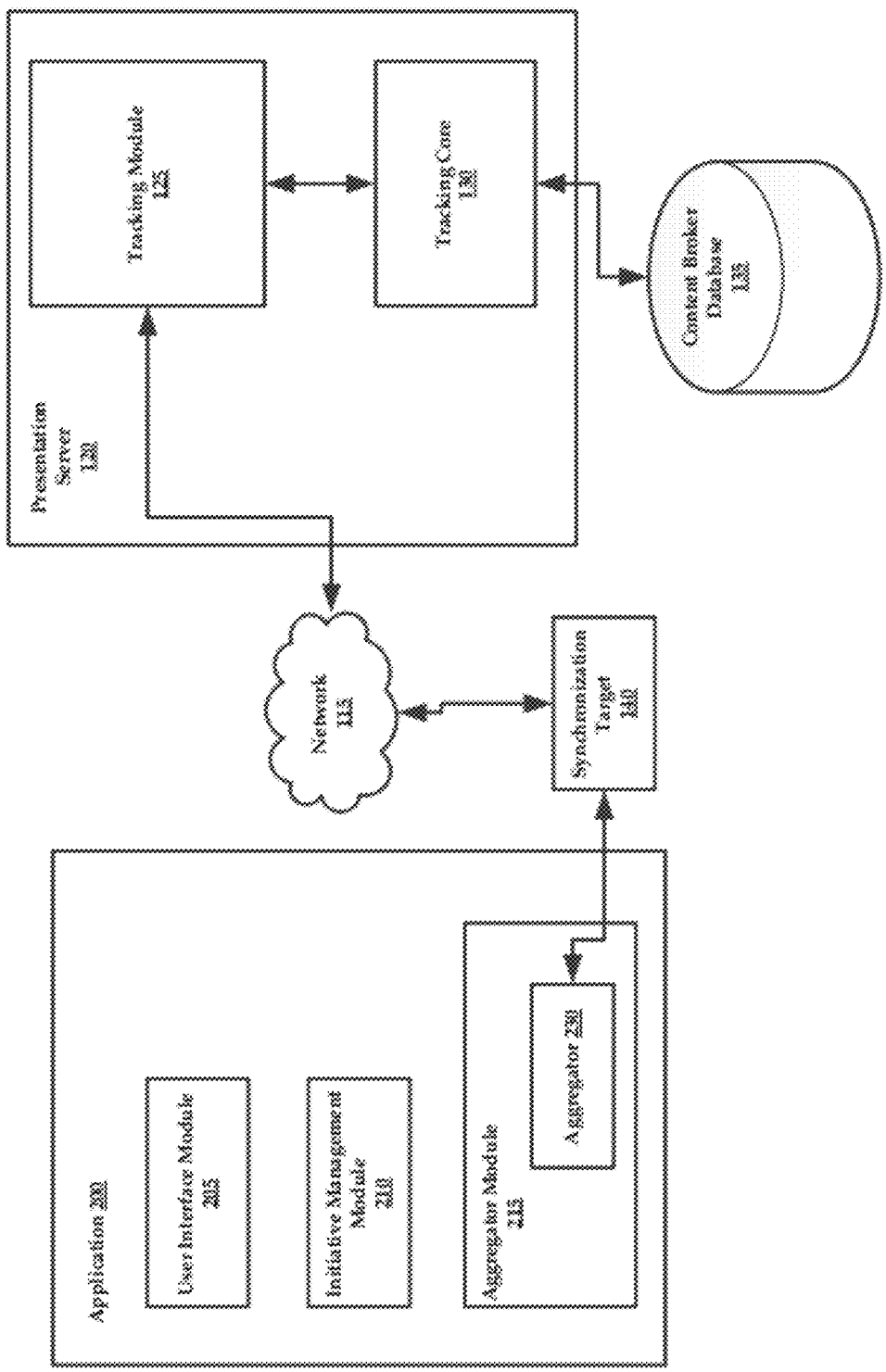
FIG. 2 illustrates an application resident on a web server.

Referring now to FIGS. 1 and 2 collectively, the web server 110 may be described as a particular purpose computing system that includes executable instructions that when executed by the processor of the web server 110, cause the web servers 110 to generate and evaluate the performance of online marketing initiatives. It will be understood that generating online marketing initiatives may also include publishing of online marketing initiatives to the presentation server 120, making the online marketing initiatives accessible to visitors via visitor device 105B. While the executable instructions resident on the web server 110 may include any number of modules, engines, applications, functions, and so forth, for the purposes of clarity, the executable instructions may be generally described as an application 200 having one or more modules.

Generally speaking, the application 200 may include a user interface module 205, an initiative management module 210, and an aggregation module 215. It will be understood that the application 200 may include fewer or more modules and/or engines and still fall within the scope of the present technology.

In other embodiments, the application 200 includes a standalone application that may interact with a content management application 220, although one of ordinary skill in the art will appreciate that the application 200 may be a constituent component of the content management application 220 as well.

In practice, the application 200 is adapted to receive data from the content management application 220 that may be utilized by end users to create online marketing initiatives across a wide array of platforms. For example, a content manager may utilize the content management application 220 to create a global marketing framework (not shown), or content blueprint. The content manager may build assets that may be utilized by end users within the context of the application 200 to create online marketing initiatives. While the content management application includes a wide variety of additional functionalities, further details regarding the content management application are beyond the scope of this document.

Non-limiting examples of assets include, a banner, a hyperlink, a video file (or collection of video files), an audio file (or collection of video files), an image file (or collection of image files), a web page, an advertisement, and so forth. Moreover, an asset may include interactive properties such that visitor interaction with the asset produces a result. For example, a visitor clicking on an interactive banner advertisement may cause a redirection of the web browser of the visitor to another web page. One of ordinary skill in the art will be fluent with the creation and contents of online marketing assets, therefore, a comprehensive discussion of the details and creation of these assets will not be provided.

Figure 3:
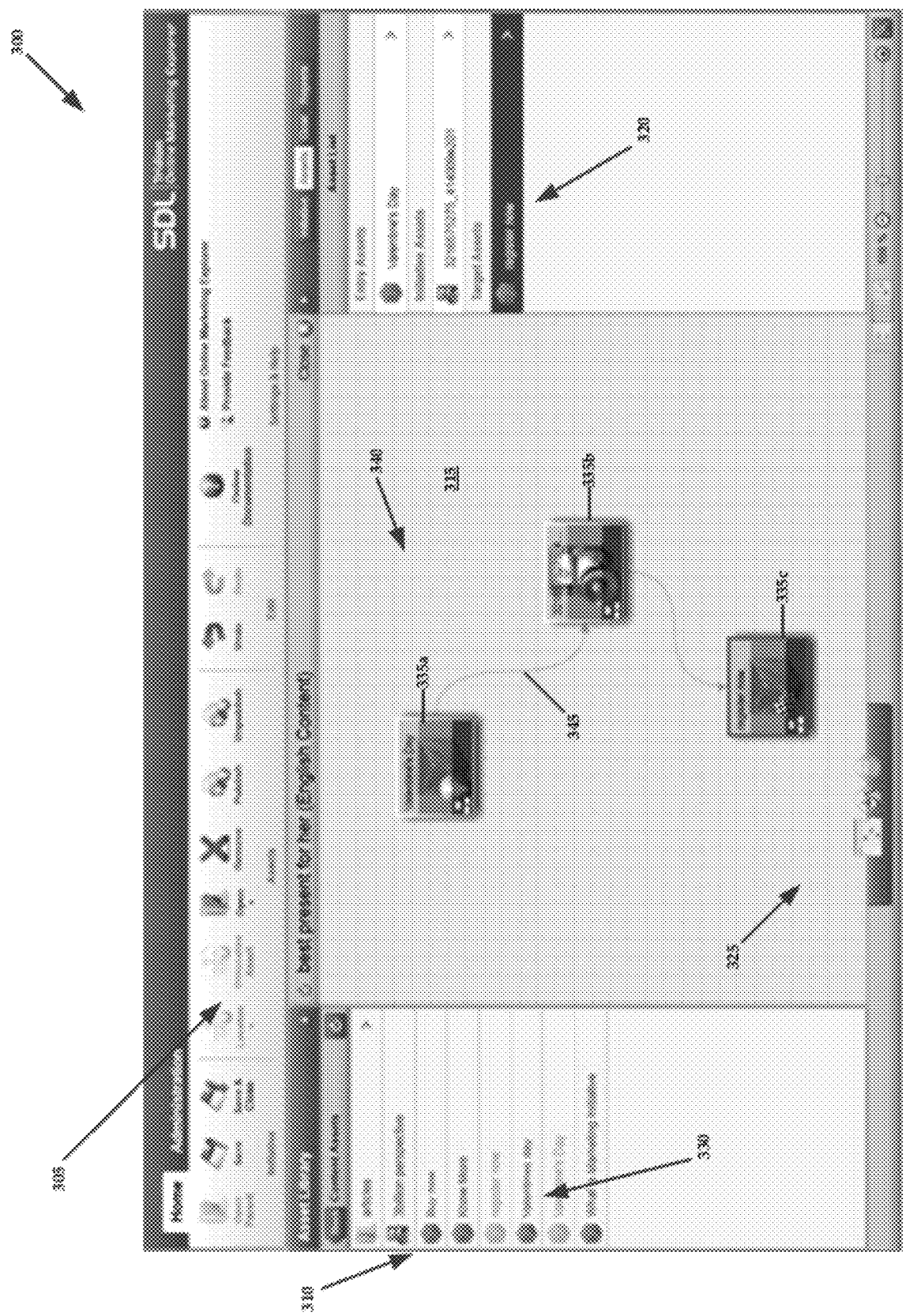
FIG. 3 illustrates an exemplary representation of a dashboard generated by the application of FIG. 2 to receive input from end users that may be utilized to generate online marketing initiatives.

Referring now to FIGS. 2 and 3 collectively, according to some embodiments, the user interface module 205 may be adapted to generate and display a wide variety of graphical user interfaces and visual representations of data. For example, the user interface module 205 may generate a graphical user interface in the form of a dashboard 300. The dashboard 300 may include a plurality of sections such as a ribbon toolbar 305, an asset library 310, a workspace 315, an asset detail pane 320, and an initiative navigation bar 325.

The ribbon toolbar 305 may include a plurality of actions available for the current section, such as open, save, remove, publish, and so forth. End users may select one or more assets from the asset library 310 that includes a plurality of containers 330 that each include one or more assets that have been categorized under the associated container. Broad container categories may include, but are not limited to, templates (predefined collections of assets), initiatives (previously created initiatives that include assets), components for web pages, and the like. End users may access assets efficiently by clicking on the containers 330 and selecting a desired asset. In some embodiments, the asset may be dragged to the workspace 315.

Workspace 315 is shown as including assets 335*a*, 335*b*, and 335*c*, which together collectively represent an online marketing initiative 340. The asset detail pane 320 provides end users with the ability to selectively modify the attributes of individual assets. The initiative navigation bar 325 provides end users with the ability to manage the creation of multiple online marketing initiatives within the application 200 at one time. Flow paths 345 indicate the flow between one or more assets. For example, entry asset 335*a* is associated with an interactive banner that, when clicked, flows via flow path 345 to a goal asset 335c that includes a video advertisement.

Additionally, the user interface module 205 may generate graphical displays of tracking data or performance reports in the form visual representations, which are described in greater detail with reference to FIGS. 4-6. The user interface module 205 may also generate a wide variety of additional menus, displays, and so forth that enable end users to interact with the application 200.

After end users have utilized the dashboard 300 to create online marketing initiative, the end users may define the performance metrics to be determined for specific assets or the entire online marketing asset. The performance metrics may dictate the type of tracking data that is obtained from the presentation server 120.

For example, an end user may add and/or define specific entry assets in the workspace 315 and specify that all tracking data relative to the specific entry assets should be gathered. As such, generic tracking of data such as Google ads data may be gathered from a single Google ad referrer for a specific entry asset, or plurality of Google ads that function as individual entry assets. Specific performance metrics would include channel parameters that allow the reporting aggregators 230 to identify social networking actions (e.g., retweets, reposts, and so forth) through a social networking media application, or an associated referrer application operatively coupled with the social networking media application. These types of information may be gathered aggregately, or with reference to a particular period of time to determine the performance of the online marketing initiative over the specified period of time.

It will be understood that apart from specified referrers (e.g., entry assets), all data generated by referrers to entry assets (up to a maximum depending on performance) may be tracked and stored. In some embodiments, the reporting aggregators 230 may be adapted to identify unique hits to individual entry assets. Where it is not possible to identify unique referrers, such as when entry assets are unique URLs, the tracking data may not be presented in any graphical views, but may be provided for download and further manual aggregation.

After end users have utilized the dashboard 300 to create one or more online marketing initiatives, the end users may provide the online marketing initiatives to the presentation servers 120 by clicking the publish button of the ribbon toolbar 305 the presentation servers 120 then publishes the one or more online marketing initiatives.

The user interface module 205 communicates the received input to the initiative management module 210 that may be adapted to create online marketing initiatives from the received input. Additionally, the initiative management module 210 may be adapted to store the online marketing initiatives in a database associated with the web server 110.

Upon clicking the publish button, the application 200 may compile or otherwise prepare the one or more online marketing initiatives for delivery to the presentation servers 120 in a format that may allow the presentation servers 120 to publish the online marketing initiatives. Moreover, if an online marketing initiative that is compiled or prepared is a global initiative that is associated with a plurality of dependent publications, the plurality of dependent initiatives may be simultaneously compiled or prepared and published across a plurality of websites associated with a plurality of presentations servers 120.

Turning again to FIG. 1, each of the presentation servers 120 may include a tracking module 125 and a tracking core 130 that may be operatively associated with a content broker database 135. The tracking module 125 may be adapted to gather information regarding the interactions of visitors with data published on the presentation server 120. In some embodiments, the tracking module 125 may include an ambient data framework that provides a flexible and configurable framework for gathering and transforming a wide array of presentation server data that corresponds to web content hosted thereon. According to some embodiments, the tracking module 125 may include an ambient data framework as described with greater detail in U.S. patent application Ser. No. 13/016,988 filed on Jan. 29, 2011, titled "SYSTEMS, METHODS, AND MEDIA FOR MANAGING AMBIENT ADAPTABILITY OF WEB APPLICATIONS AND WEB SERVICES."

In some applications, the tracking module 125 may create a client-side cookie to track anonymous visitors (and recognized visitors) and a session cookie to store information about the visitor session. The tracking module 125 may be called on each request for web content hosted by the presentation server 120 to generate and store various types of tracking data.

By way of non-limiting example, the tracking module 125 may be adapted to determine and store tracking data that includes, time stamps that correspond to a time at which a request for web content was received by the presentation server 120, along with a unique visitor identification assigned by the presentation server to each request for web content. Tracking data may include an external referrer uniform resource locator (URL), if any, which corresponds to the URL of the web content through which the visitor entered.

In some embodiments, the tracking module 125 may be adapted to track the assets of online marketing initiatives published on the presentation server 120 by way of uniform resource indicators (URI) associated with each of the assets. For example, the tracking data may also include an internal referrer URI, if any, which corresponds to the URI of another page from which the user arrives. In some embodiments, tracking data may include computing system data such as a media access control (MAC) address, an Internet protocol (IP) address, an operating system version, a web browser version, and so forth.

In other embodiments, the tracking data may include a contact identification URI and mailing identification URI, if an outbound electronic mail link(s) is clicked by the visitor, along with URIs of visited web pages and/or web page template data. Additionally, tracking data may include visitor data gathered from cookies placed on the visitor device 105B.

Additionally, the tracking data may include a list of assets on a web page such as asset identification information and asset template identification URI pairs associated with a web page.

The tracking core 130 of the presentation server 120 may handle the persisting of visitor tracking data to the content broker database 135. End users may select an instance of the content broker database 135 to which they desire to store tracking data in a configuration file.

In other embodiments, the tracking core 130 may also handle requests from synchronization targets configured in the content management application 220 for collecting visitor session data. For example, the tracking core 130 may keep track of visitor sessions that have not changed for a given period of time. These synchronization targets may gather visitor session data according to a predetermined schedule. For example, end users may configure the session timeout (which may include any period of time, but may include a default time period of approximately 20 minutes) in a configuration file utilized by the tracking module 125.

The synchronization target 140 may be adapted to push or otherwise communicate the URIs of tracked assets to the presentation server 120 and provide tracking data collected by the presentation server 120 to the application 200. The tracking data may be utilized by the aggregation module 215 to generate performance reports corresponding to the performance of the online marketing initiatives.

The synchronization target 140 provides end users with the ability to configure, for example, a URL to the presentation server 120 where tracking data may be collected for analysis by the aggregation module 215. The URL may point to a tracking module 125 such as a web page, a web form, a javaserver page, a .NET aspx web forms, and/or hypertext markup language documents, deployed on the presentation server 120 that communicates with the tracking core 130 to retrieve tracking data via the synchronization target 140.

For applications where end users desire to publish online marketing initiatives to a plurality of presentation servers 120, end users may configure a separate synchronization target 140 for each presentation server 120. The synchronization target 140 may communicate with the tracking core 130 at configured intervals to identify visitor sessions that have not changed in within the predetermined period of time establish by the end users.

The aggregation module 215 may function as a conduit for processing tracking data received via one or more synchronization targets 140. The aggregation module 215 may be adapted to receive tracking data from synchronization targets 140 and provide the tracking data to one or more aggregators 230. The aggregators 230 may each retrieve details regarding the online marketing initiative associated with the tracking data (e.g., associated with the asset(s)), in order to save the proper tracking data for each marketing initiative. That is, the aggregation module 215 may be adapted to receive information such as URIs that correspond to assets that are to be tracked.

The aggregation module 215 may also function to persist tracking data aggregated by the aggregators 230 in an aggregation database 135 associated with the web server 110.

In some additional embodiments, the aggregation module 215 may be adapted to retrieve tracking data from a tracking module 125 via a synchronization target 140 that corresponds to one or more assets associated with one or more online marketing initiatives. That is, the aggregation module 215 may retrieve tracking data for an online marketing initiative that includes an interactive banner associated with a landing page advertisement such as a video. The interactive banner may be referred to as an "entry" asset because the visitor "enters" the online marketing initiative through the interactive banner.

Tracking data relative to the online marketing initiative may include an aggregate number of times visitors clicked the interactive banner and subsequently clicked or utilized the advertisement associated with the landing page. As such, the aggregation module 215 may be adapted to determine if visitors who click the interactive banner actually play the video advertisement associated with the landing page.

In other embodiments, tracking data for individual assets or online marketing initiatives may be utilized by the aggregation module 215 to determine a variety of user-defined performance metrics that assist end user in determining specific quantifiable information corresponding to their online marketing initiatives. For example, tracking data may be utilized to determine if visitors reacted favorably to the assets such as campaign drivers. Tracking data may be utilized to determine overall number of visitors that viewed specific online marketing initiative assets.

More detailed performance metrics may include the ability to determine how visitors reacted to particular assets. For example, the percentage of visitors who viewed a given asset and subsequently successfully completed viewing or interacting with additional assets of the online marketing initiative in the same visit. In another example, performance metrics may include a percentage of visitors who viewed an asset and did not view or interact with additional assets of the online marketing initiative in the same visit.

In additional embodiments, if tracking data is being gathered for a goal asset, the end user may see a percentage of visitors to the online marketing initiatives that successfully interacted with the goal asset (as a percentage of the overall visitors to the online marketing initiatives), or potentially view the percentage of visitors that failed to successfully interact with the goal asset.

Examples of performance metrics for lead generation may include the number of visitors that complete a web form, the percentage of visitors that viewed the web form and completed the form, and a breakdown of visitors that viewed the web form by an entry asset.

Examples of performance metrics for awareness may include visitors that viewed an asset or a set of assets, or a percentage of visitors that viewed the asset and completed the web form associated with the asset, along with a breakdown of visitors that viewed the web form by accessing the web form via an entry asset.

Examples of performance metrics that may be utilized to ensure that more visitors complete the web form that during a first given period of time include determining a percentage of visitors that viewed the web form and completed the web form during a baseline period of time as compared to the current statistics of the online marketing initiative during a subsequent period of time.

Examples of performance metrics for improving and/or updating contacts may include determining visitors that filled in a profile, where the end user specifies the minimum characteristics that must be updated to qualify. It will be understood that tracking data may include the percentage of visitors that viewed the form that filled in the profile appropriately and/or a breakdown of visitors that viewed the web form by way of an entry asset.

As such, the aggregation module 215 may be adapted to organize the tracking data for individual online marketing initiatives that may be utilized by the user interface module 205 to generate and display visual representations of a performance metric that corresponds to the one or more online marketing initiatives relative to end user define goals.

More specifically, the application 200 may allow end users to specify one or more goals for a particular marketing initiative. For example, a goal may include a particular number of unique visitors clicking on an interactive banner that passes the visitor through to a video that includes an advertisement. Visitors clicking on and playing the video are recorded as a successful event. The goal may be defined as ten unique visitors who play the video each day. These goals may be selectively modified by the end user and may provide the end user with a wide array of analytical information regarding online marketing initiatives.

Based upon the defined goals, the synchronization targets 215 associated with the online marketing initiatives cause the tracking module 125 to gather appropriate tracking data for each of the assets of the online marketing initiatives that are associated with the goals. The synchronization targets 215 may communicate the tracking data to one or more aggregators 230 of the aggregation module 215 for processing. Visual representations may then be generated from the tracking data that provide the end user with readily ascertainable information about the performance metrics of online marketing initiatives. That is, performance metrics may be defined as the comparison of tracking data of assets relative to one or more the goals.

Because the aggregation module 215 may be adapted to track assets by a unique URI, the aggregation module 215 may evaluate visitor interactions with the presentation server 120 in terms of performance metrics, rather than more ambiguous data such as whether a visitor requests web content from the presentation server 120. As such, the application 200 may be utilized to specifically track the efficacy of the combination of certain assets and evaluate online marketing initiatives having different combinations of assets relative to one another.

End users may utilize the visual representations as the basis for intelligent modification of existing online marketing initiatives or building future online marketing initiatives.

In other embodiments, the tracking data may also include demographic information corresponding to the number and/or types of visitors accessing the online marketing initiatives. Therefore, in addition to determining the performance of online marketing initiatives, the application 200 may provide end users with demographic information that is directly correlated to online marketing initiatives.

For example, an end user may determine that online marketing initiatives created for social networking media achieve 100% of their goals for visitors that fall within an age range of 18-34 years old. Conversely, online marketing initiatives created for social networking media achieve on 5% of their goals for visitors that fall within an age range of 45-60 years old. Therefore, the end users may intelligently design online additional marketing initiatives for visitors that fall within an age range of 18-34 years old for social networking media.

Additionally, the ability of the application 200 to continuously gather tracking data from the presentation servers 120 allows end users to modify the assets of an underperforming online marketing initiative during its life span, rather than waiting until the end of the life span of the online marketing initiative to determine the efficacy of the online marketing initiative. The tracking data may also allow end users to define a life span of an online marketing campaign and periodically determine the time remaining in the life span of the online marketing initiative.

Figure 4:
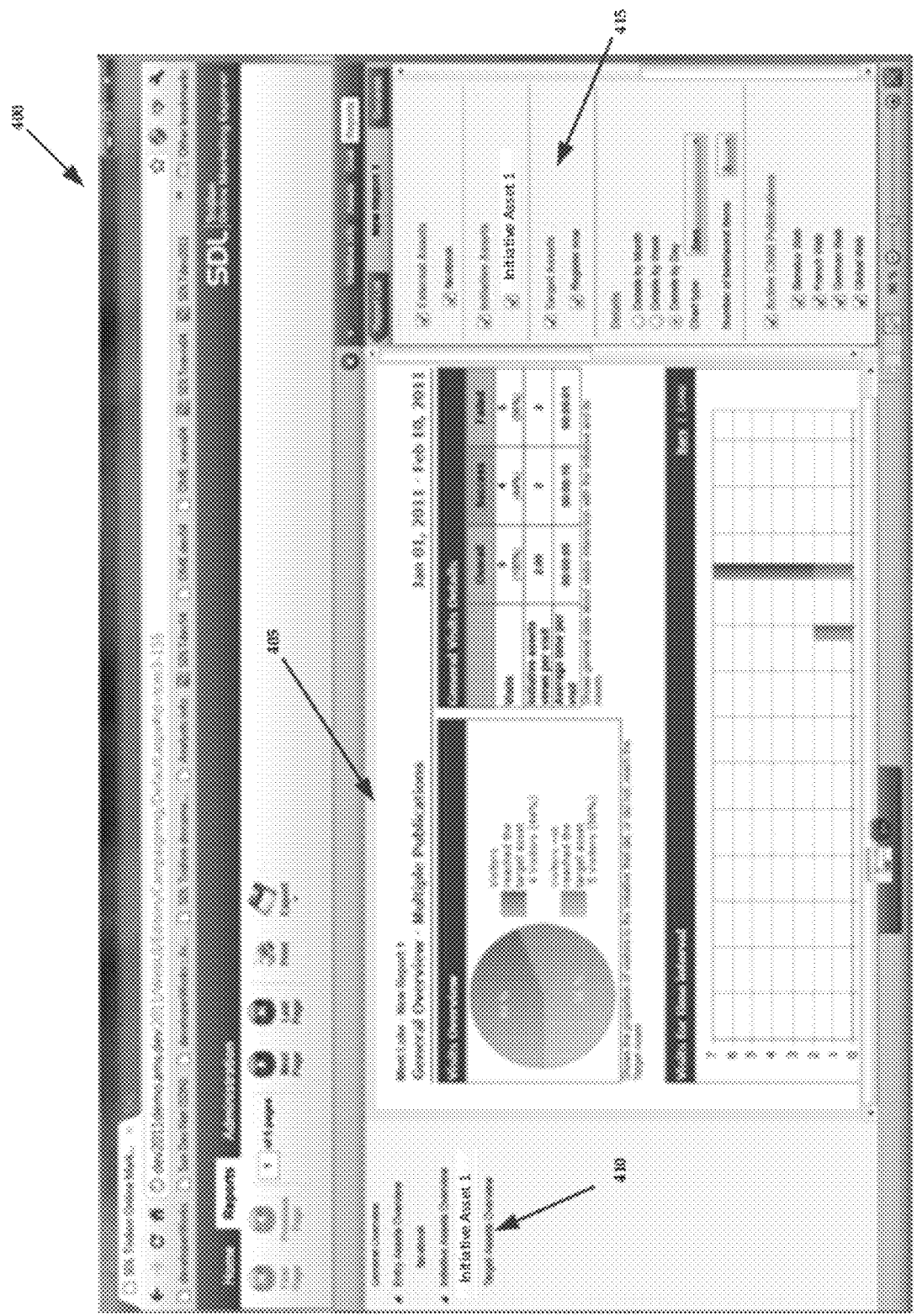
FIG. 4 illustrates an exemplary analytics interface having visual representations of performance metrics for a single online marketing initiative.

Referring now to FIG. 4, an exemplary analytics interface 400 is shown as comprising a visual representation of an online marketing initiative that includes a pie chart 405 corresponding to an amount or type of successful and unsuccessful events associated with the online marketing initiative. The interface 400 also includes a bar graph 410 chronicling the life of the online marketing initiative along a given timeline. The interface 400 may also include a detail pane 415 that allows an end user to specify the way in which the interface 400 displays the tracking data.

The detail pane 415 allows end users to specify the goal of the interactive marketing initiative that may be utilized as the basis for creating visual representations of tracking data.

Figure 5:
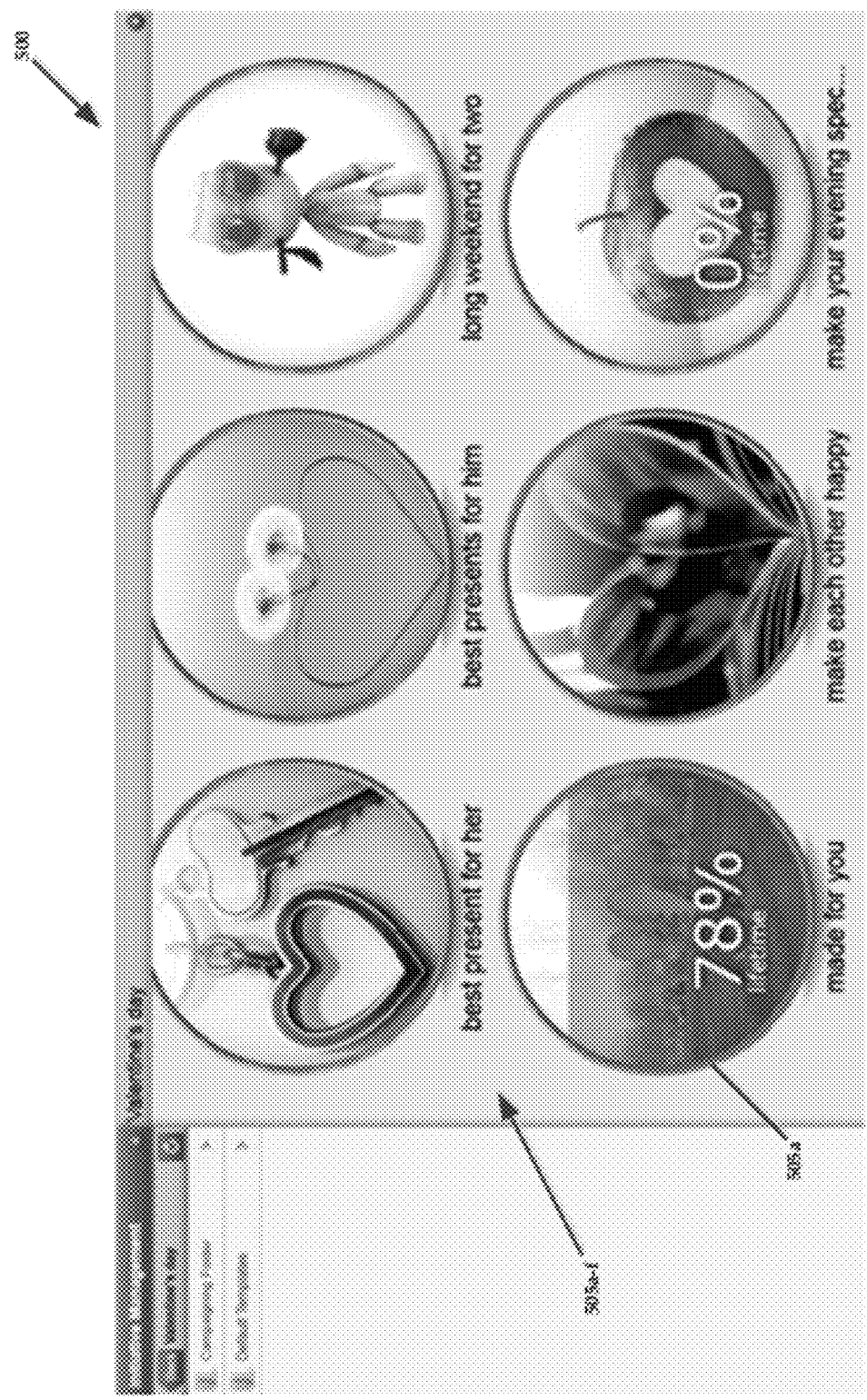
FIG. 5 illustrates an additional exemplary analytics interface having visual representations of performance metrics for a plurality of online marketing initiatives.

Referring now to FIG. 5, an additional exemplary analytics interface 500 is shown as comprising a plurality of visual representations 505*a-f* that provide an easily ascertainable comparison of a plurality of online marketing initiatives that correspond to a common global marketing framework. Each of the visual representations 505*a-f* includes an image that corresponds to a particular online marketing initiative. Moreover, each of the images of the visual representations 505*a-f* may initially be slightly transparent. As tracking data is collected and successful events are recorded relative to the goal associated with the online marketing initiative, the visual representations 505*a-f* may change. For example, visual representation 505*a* is shown as having achieved 78% of the goal associated therewith. To represent the achievements, approximately 78% the image of visual representation 505*a* is darkened, and the textual information of "78%" may be overlaid upon the image.

Although not shown, the analytics interface 500 may be adapted to display a variety of predefined performance metrics including, but not limited to top performing online marketing initiatives that are currently live, the worst performing online marketing initiatives that are currently live, the worst performing assets that are currently in use in an online marketing initiative, the best performing online marketing initiatives so far (closed online marketing initiatives and currently in progress), online marketing initiatives in planning stages, and recently modified online marketing initiatives.

According to other embodiments, rather than darkening the image associated with a visual representation, the visual representations may include one or more colors corresponding to a current status of the online marketing initiative relative to the goal associated therewith. For example, if the visual representation is red, the online marketing initiative is not currently achieving the goals associated therewith. If the visual representation is green, then the online marketing initiative is achieving the goal.

As stated previously, end users may utilize the application 200 to create localized online marketing initiatives for a plurality of languages and/or countries. The localized online marketing initiatives may inherit portions of a global marketing framework, but may be customized to target a particular group or groups of consumers. Utilizing the above-described performance evaluation methods, end users may evaluate localized online marketing initiatives and determine successful and/or unsuccessful localized online marketing initiatives. Based upon such data, end users may selectively modify one or more underperforming localized online marketing initiatives by incorporating successful assets from one or more successful localized online marketing initiatives into the one or more underperforming localized online marketing initiatives.

Utilizing the same techniques, other types of unsuccessful online marketing initiatives may be selectively modified to more closely resemble successful online marketing initiatives. Selective modification of unsuccessful online marketing initiatives may include adding, removing, or modifying assets. For example, an end user may specify that the performance metric for an online marketing campaign includes a given number of unique visitors clicking on an interactive banner advertisement within each hour. As such, tracking data may indicate that the interactive banner advertisement is not successfully achieving the performance metric established by the end user. Rather than waiting until the end of the life span of the online marketing initiative, the end user may utilize the application 200 to replace the interactive banner with an interactive video, or may modify any portion of the asset, such as the size or appearance of the interactive banner. In further exemplary embodiments, the user may modify the flow path of one or more assets. Changes to the assets of the online marketing initiative are immediately pushed to the presentation server 120, and the performance of the modified online marketing initiative may be monitored by obtaining tracking data for the modified assets.

Changes in the performance of the selectively modified online marketing initiatives may be quantified or verified by subsequent tracking via the application 200.

Figure 6:
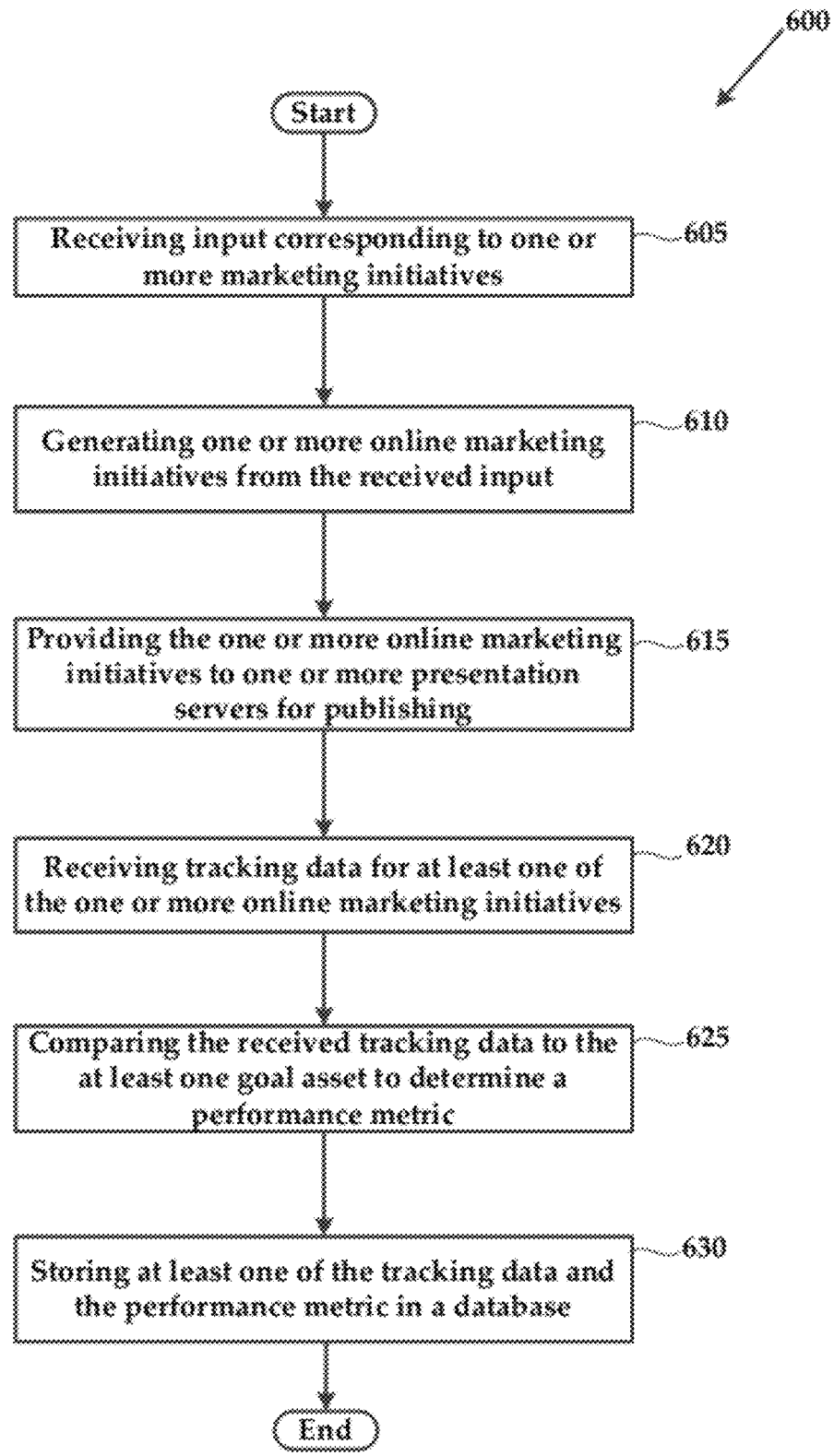
FIG. 6 is an exemplary flow diagram of a method for generating and evaluating the performance of online marketing initiatives.

Referring now to FIG. 6, a method 600 for evaluating the performance of online marketing initiatives is shown. In exemplary embodiments, the steps of the method 600 are performed by a web server adapted to generate and evaluate the performance of online marketing initiatives. One of ordinary skill in the art will appreciate that the steps of the method 600 may also occur on one or more web servers, one or more presentation servers, or across a distributed computing system such as a cloud computing system.

In some embodiments, the method 600 may include the step 605 of receiving input corresponding to one or more marketing initiatives. The input may be received from one or more end users via a graphical user interface that provides a collaborative framework for multiple end users to create a cohesive online marketing strategy that may be distributed across a wide variety of platforms such as web pages and social networking media.

It will be understood that each of the one or more online marketing initiatives may include at least one entry asset associated with at least one goal asset. The method 600 may also include the step 610 of generating one or more online marketing initiatives from the received input.

Next, the method 600 may include the step 615 of providing the one or more online marketing initiatives to one or more presentation servers for publishing the one or more online marketing initiatives to one or more platforms. After the presentation server has published the one or more marketing initiatives, the method 600 may include the step 620 of receiving tracking data for at least one of the one or more online marketing initiatives from the presentation servers.

The method 600 may then include the step 625 of comparing the received tracking data to the at least one goal asset to determine a performance metric for the at least one marketing initiative. The performance metrics may be displayed to the end user in an easily understood visual format that enables the end user to quickly determine the performance of the one or more online marketing initiatives. The method 600 may also include a step 630 of storing at least one of the tracking data and the performance metric in a database coupled to at least one of the web server and the one or more presentation servers.

Figure 7:
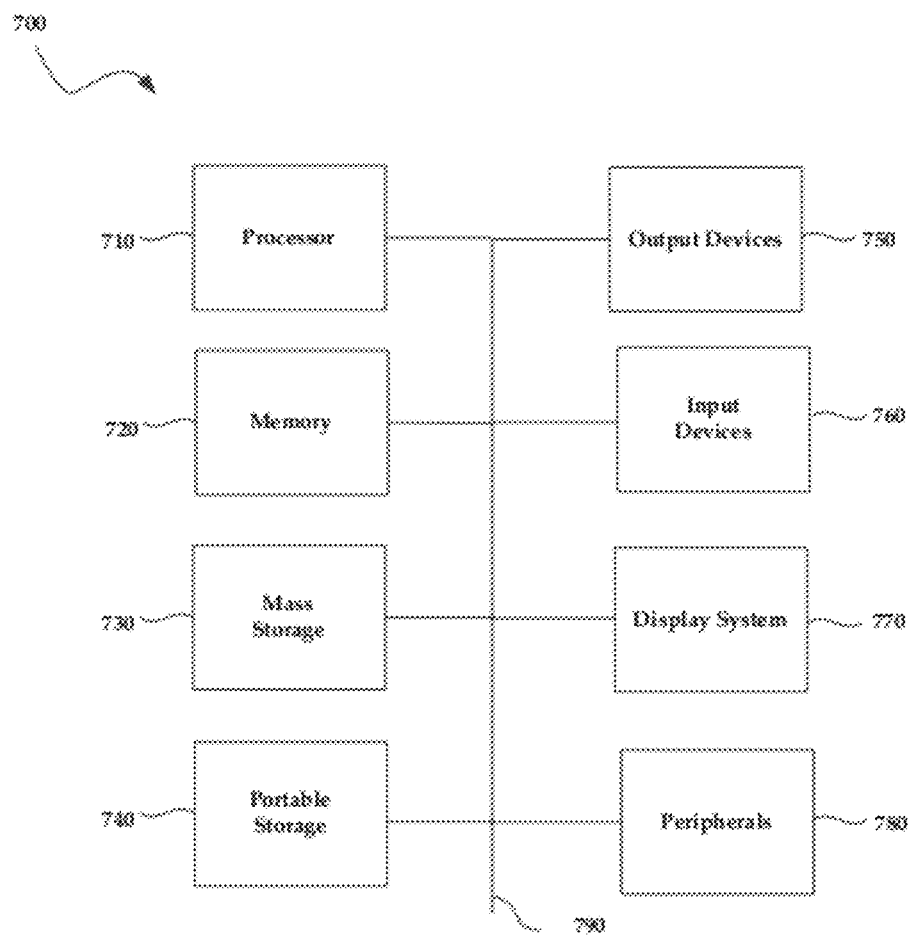
FIG. 7 is a block diagram of an exemplary computing system that may be utilized to practice aspects of the present disclosure.

FIG. 7 illustrates an exemplary computing system 700 that may be used to implement an embodiment of the present technology. The computing system 700 of FIG. 7 includes one or more processors 710 and memory 720. Main memory 720 stores, in part, instructions and data for execution by the one or more processors 710. Main memory 720 can store the executable code when the computing system 700 is in operation. The computing system 700 of FIG. 7 may further include a mass storage device 730, portable storage 740 (e.g., medium drive(s)), output devices 750, user input devices 760, a display system 770, and other peripheral devices 780.

The components shown in FIG. 7 are depicted as being connected via a single bus 790. The components may be connected through one or more data transport means. The one or more processors 710 and memory 720 may be connected via a local microprocessor bus, and the mass storage device 730, peripheral device(s) 780, portable storage 740, and display system 770 may be connected via one or more input/output (I/O) buses.

Mass storage device 730, which may be implemented with a magnetic disk drive or an optical disk drive, is a non-volatile storage device for storing data and instructions for use by the one or more processors 710. Mass storage device 730 can store the system software for implementing embodiments of the present technology for purposes of loading that software into main memory 720.

Portable storage 740 operates in conjunction with a portable non-volatile storage medium, such as a floppy disk, compact disk or Digital video disc, to input and output data and code to and from the computing system 700 of FIG. 7. The system software for implementing embodiments of the present technology may be stored on such a portable medium and input to the computing system 700 via the portable storage 740.

Input devices 760 provide a portion of a user interface. Input devices 760 may include an alphanumeric keypad, such as a keyboard, for inputting alphanumeric and other information, or a pointing device, such as a mouse, a trackball, stylus, or cursor direction keys. Additionally, the system 700 as shown in FIG. 7 includes output devices 750. Suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. Peripheral device(s) 780 may include a modem or a router.

The components contained in the computer system 700 of FIG. 7 are those typically found in computer systems that may be suitable for use with embodiments of the present technology and are intended to represent a broad category of such computer components that are well known in the art. Thus, the computer system 700 of FIG. 7 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus.

Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for executing and optimizing performance of interactive online marketing initiatives, comprising:
   building assets for use by end users to create interactive online marketing initiatives;
   generating a user interface that includes a graphical representation of interactive online marketing initiatives, entry assets, goal assets, and flow paths;
   receiving, from the user interface, input including a user selection of an entry asset, a goal asset, and a flow path between the entry asset and the goal asset, the input corresponding to an interactive online marketing initiative;
   generating the online marketing initiative based on the user selected entry asset, goal asset, and flow path;
   generating, in the user interface, a graphical representation of the online marketing initiative including the user selected entry asset, goal asset, and flow path;
   publishing the online marketing initiative via one or more presentation servers to one or more platforms during a lifespan of the online marketing initiative for interaction with visitors to the one or more platforms;
   periodically modifying the online marketing initiative until an end of the lifespan of the online marketing initiative, the modifying comprising repeatedly:
      continuously gathering, from the one or more presentation servers, tracking data for the interactive online marketing initiative during the lifespan of the online marketing initiative, the tracking data including uniform resource indicator pairs indicating visitor interactions with an entry asset and successful visitor interactions with a goal asset, the entry asset being an internal referrer uniform resource indicator, which corresponds to another page from which a visitor arrives at the goal asset;
      comparing the tracking data to one or more performance metrics for visitor interactions with both the entry asset and goal asset to identify successful and unsuccessful assets from performance of the online marketing initiative;
      displaying results of the comparison to an end user on the user interface;
      receiving, from the user interface, changes to assets based on the performance of the online marketing initiative, the changes including a change to at least one of the entry asset, the goal asset, and the flow path;
      generating, in the user interface, a graphical representation of the changes to the at least one of the entry asset, the goal asset, and the flow path; and
      generating, during the lifespan of the online marketing initiative, a modified interactive online marketing initiative using the received changes to the assets;
   wherein generating the modified online marketing initiative causes the generation of a plurality of dependent publications that include the changes to the online marketing initiative; and
   wherein the plurality of dependent publications is simultaneously prepared and published.

2. The method according to claim 1, wherein the entry asset includes any of a banner, a web page, a hyperlink, an interactive image, an interactive video, and combinations thereof.

3. The method according to claim 1, wherein the goal asset includes any of a landing web page, a web form, a click through, an advertisement, a promotion, a coupon, and combinations thereof.

4. The method according to claim 3, wherein the one or more performance metrics of the online marketing initiative includes a percentage of visitors who viewed the entry asset and did not view or interact with the goal asset in a same visit.

5. The method according to claim 1, wherein the one or more platforms includes an RSS and news feeds, a web content aggregator, a web engine, one or more web pages, social networking medias, a search engine, an online ad engine, a banner engine, online news groups, forums, standard web applications, mobile web applications, and combinations thereof.

6. The method according to claim 1, further comprising receiving input corresponding to the online marketing initiative from a global marketing framework.

7. The method according to claim 1, further comprising evaluating the tracking data to:
   determine information corresponding to visitor interactions with at least one of the goal asset and the entry asset associated with the online marketing initiative; and
   obtain demographic information corresponding to each visitor.

8. The method according to claim 1, wherein the one or more performance metrics includes an aggregate number of visitors who viewed the entry asset and subsequently successfully completed viewing or interacting with goal asset in a same visit.

9. The method according to claim 1, further comprising:
   generating, via a web server, one or more visual representations corresponding to at least a portion of the tracking data relative to the one or more performance metrics for the online marketing initiative; and
   providing the one or more visual representations via the web server to one or more client devices.

10. The method according to claim 1, further comprising generating a visual representation of the one or more performance metrics for the online marketing initiative and providing the visual representation to a client device via a web server.

11. A system for executing and optimizing performance of online marketing initiatives, comprising:

a memory for storing executable instructions for evaluating performance of online marketing initiatives;

a processor configured to execute the instructions stored in the memory to:

generate a user interface that includes a graphical representation of online marketing initiatives, entry assets, goal assets, and flow paths;

receive, via a web server, input corresponding to one or more online marketing initiatives, for each of the one or more online marketing initiatives the received input including an entry asset, a goal asset, and a flow path between the entry asset and the goal asset;

generate, at the web server, one or more online marketing initiatives from the entry asset, goal asset, and flow path of the received input;

provide the one or more online marketing initiatives to one or more presentation servers for publishing the one or more online marketing initiatives to one or more platforms during a lifespan of the one or more marketing initiatives for interaction with visitors to the one or more platforms;

periodically modify the each online marketing initiative until an end of the lifespan of the online marketing initiative, the modifying comprising repeatedly:

receive, from the one or more presentation servers, tracking data for the online marketing initiative during the lifespan of the online marketing initiative, the tracking data including uniform resource indicator pairs indicating visitor interactions with an entry asset and successful visitor interactions with a goal asset, the entry asset being an internal referrer uniform resource indicator, which corresponds to another page from which a visitor arrives at the goal asset;

compare the tracking data to a performance metric for visitor interactions with both the entry asset and the goal asset to identify successful and unsuccessful assets from performance of the online; and display results of the comparison to an end user on the user interface;

receive, from the user interface, changes to an asset based on the performance of the online marketing initiative, the changes including a change to at least one of the entry asset, the goal asset, and the flow path;

generate, in the user interface, a graphical representation of the changes to the at least one of the entry asset, the goal asset, and the flow path; and generate, during the lifespan of the online marketing initiative, a modified online marketing initiative using the received changes to the at least one of the entry asset, the goal asset and the flow path; and store the tracking data in a database;

wherein the generation of the modified online marketing initiative causes the generation of a plurality of dependent publications that include the changes to the online marketing initiative; and wherein the plurality of dependent publications of the one or more online marketing initiatives is simultaneously prepared and published when the one or more online marketing initiatives are updated.

12. The system according to claim 11, wherein the one or more online marketing initiatives each further include at least one entry asset that includes any of a banner, a web page, a hyperlink, an interactive image, an interactive video, and combinations thereof.

13. The system according to claim 11, wherein the one or more online marketing initiatives each further include at least one goal asset that includes any of a landing web page, an advertisement, a promotion, a coupon, and combinations thereof.

14. The system according to claim 11, wherein the one or more platforms includes an RSS and news feeds, a web content aggregator, a web engine, one or more web pages, social networking medias, a search engine, an online ad engine, a banner engine, online news groups, forums, standard web applications, mobile web applications, and combinations thereof.

15. The system according to claim 11, wherein the processor is further adapted to execute the instructions stored in the memory to receive input corresponding to the one or more online marketing initiatives from a global marketing framework.

16. The system according to claim 11, wherein the processor is further adapted to execute the instructions stored in memory to evaluate the tracking data to:

determine information corresponding to visitor interactions with an entry asset associated with at least one of the one or more online marketing initiatives; and obtain demographic information corresponding to each visitor.

17. The system according to claim 11, wherein the performance metric includes an aggregate number of visitors who access the goal asset via the entry asset of the online marketing initiative.

18. The system according to claim 11, wherein the periodically modifying further comprises generate one or more visual representations corresponding to at least a portion of the tracking data relative to the performance metric for the online marketing initiative and provide the one or more visual representations via the web server.

19. The system according to claim 11, wherein the online marketing initiative causes corresponding modifications in additional online marketing initiatives associated with the online marketing initiative.

20. A non-transitory executable storage medium having a computer program embodied thereon, the computer program executable by a processor in a computing system to perform a method for executing and optimizing performance of online marketing initiatives, the method comprising:

receiving, via a web server, input corresponding to an online marketing initiative that includes an entry asset, a goal asset, and a flow path between the entry asset and the goal asset, the input corresponding to an online marketing initiative;

generating, via the web server, the online marketing initiative from the received input;

providing the online marketing initiative to one or more presentation servers for publishing the online marketing initiative to one or more platforms during a lifespan of the online marketing initiative;

receiving, from the one or more presentation servers, tracking data for the online marketing initiative during the lifespan of the online marketing initiative, the tracking data including uniform resource indicator pairs indicating visitor interactions with the entry asset and visitor interactions with the goal asset, the entry asset being an internal referrer uniform resource indicator, which corresponds to another page from which a visitor arrives at the goal asset;

comparing the tracking data to one or more performance metrics for visitor interactions with both the entry asset and goal asset to determine successful and unsuccessful assets from performance of the online marketing initiative;

displaying results of the comparison on a user interface;

receiving, from the user interface, changes to assets based on the performance of the online marketing initiative, the changes including a change to at least one of the entry asset, the Goal asset, and the flow path;

generating, in the user interface, a graphical representation of the chances to the at least one of the entry asset, the goal asset, and the flow path; and generating a modified online marketing initiative including the received changes to the online marketing initiative as determined from the comparison;

wherein generating the modified online marketing initiative causes the generation of a plurality of dependent publications that include the changes to the online marketing initiative; and wherein the plurality of dependent publications is simultaneously and immediately prepared and published.

* * * * *